(12) United States Patent
Sasaki et al.

(10) Patent No.: US 8,767,347 B1
(45) Date of Patent: Jul. 1, 2014

(54) MAGNETIC HEAD FOR PERPENDICULAR MAGNETIC RECORDING HAVING TWO SIDE SHIELDS

(71) Applicants: Yoshitaka Sasaki, Santa Clara, CA (US); Hiroyuki Ito, Milpitas, CA (US); Kazuki Sato, Milpitas, CA (US); Kazumasa Yasuda, Sunnyvale, CA (US); Tatsuya Shimizu, Hong Kong (CN)

(72) Inventors: Yoshitaka Sasaki, Santa Clara, CA (US); Hiroyuki Ito, Milpitas, CA (US); Kazuki Sato, Milpitas, CA (US); Kazumasa Yasuda, Sunnyvale, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/903,438

(22) Filed: May 28, 2013

(51) Int. Cl.
  *G11B 5/147* (2006.01)
  *G11B 5/187* (2006.01)

(52) U.S. Cl.
  USPC ............................ 360/125.13; 360/123.06

(58) Field of Classification Search
  CPC .... G11B 5/1278; G11B 5/315; G11B 5/3116; G11B 5/3123; G11B 5/3146; G11B 5/1475; G11B 5/17

USPC ............ 360/125.02, 125.03, 123.02, 123.03, 360/123.06, 123.11, 125.09, 125.1, 125.11, 360/125.13, 125.14, 125.15
  See application file for complete search history.

(56) References Cited

U.S. PATENT DOCUMENTS

| 7,843,665 | B2 * | 11/2010 | Sasaki et al. ............. 360/125.03 |
| 8,173,028 | B2 * | 5/2012 | Ishizaki et al. ................... 216/22 |
| 8,218,264 | B1 * | 7/2012 | Sasaki et al. ............. 360/125.16 |
| 8,270,110 | B2 | 9/2012 | Araki et al. |
| 8,289,649 | B2 | 10/2012 | Sasaki et al. |
| 8,310,787 | B1 * | 11/2012 | Sasaki et al. ................ 360/125.3 |
| 8,416,528 | B1 * | 4/2013 | Sasaki et al. ............. 360/125.02 |
| 8,422,166 | B1 * | 4/2013 | Sasaki et al. ............. 360/123.06 |
| 8,427,781 | B1 * | 4/2013 | Sasaki et al. ............. 360/125.13 |
| 8,472,137 | B2 * | 6/2013 | Hirata et al. ............. 360/125.11 |
| 8,503,130 | B1 * | 8/2013 | Sasaki et al. ............. 360/123.06 |
| 8,576,514 | B2 * | 11/2013 | Sasaki et al. ................ 360/125.3 |
| 8,587,899 | B1 * | 11/2013 | Sasaki et al. ............. 360/125.13 |
| 2007/0274003 | A1 * | 11/2007 | Ota et al. ....................... 360/126 |
| 2007/0291409 | A1 * | 12/2007 | Sasaki et al. ................... 360/126 |

* cited by examiner

*Primary Examiner* — Brian Miller
(74) *Attorney, Agent, or Firm* — Oliff PLC

(57) ABSTRACT

A main pole has an end face located in a medium facing surface, and first through sixth side surfaces. The first and third side surfaces are connected to the end face of the main pole. The second and fourth side surfaces are located farther from the medium facing surface than are the first and third side surfaces. The fifth side surface connects the first side surface to the second side surface. The sixth side surface connects the third side surface to the fourth side surface. The distance between the first side surface and the third side surface decreases with increasing proximity to the top surface of the substrate. The shape of the first side surface is defined by a first side shield. The shape of the third side surface is defined by a second side shield.

6 Claims, 26 Drawing Sheets

MAGNETIC HEAD FOR PERPENDICULAR MAGNETIC RECORDING HAVING TWO SIDE SHIELDS

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has two side shields.

2. Description of the Related Art

The recording systems of magnetic read/write apparatuses include a longitudinal magnetic recording system wherein signals are magnetized in a direction along the plane of a recording medium (the longitudinal direction) and a perpendicular magnetic recording system wherein signals are magnetized in a direction perpendicular to the plane of a recording medium. It is known that the perpendicular magnetic recording system is harder to be affected by thermal fluctuation of the recording medium and capable of providing higher linear recording density when compared with the longitudinal magnetic recording system.

Magnetic heads for perpendicular magnetic recording typically have, like those for longitudinal magnetic recording, a structure in which a read head unit having a magnetoresistive element (hereinafter, also referred to as MR element) for reading and a write head unit having an induction-type electromagnetic transducer for writing are stacked on the top surface of a substrate. The write head unit includes a main pole for producing a write magnetic field in the direction perpendicular to the plane of the recording medium. The main pole has an end face located in a medium facing surface facing the recording medium.

A magnetic head for use in a magnetic disk drive such as a hard disk drive is typically in the form of a slider. The slider has the medium facing surface. The medium facing surface has an air inflow end (a leading end) and an air outflow end (a trailing end). The slider is designed to slightly fly over the surface of the recording medium by means of an airflow that comes from the leading end into the space between the medium facing surface and the recording medium.

Here, the side of the positions closer to the leading end relative to a reference position will be defined as the leading side, and the side of the positions closer to the trailing end relative to the reference position will be defined as the trailing side. The leading side is the rear side in the direction of travel of the recording medium relative to the slider. The trailing side is the front side in the direction of travel of the recording medium relative to the slider.

The magnetic head is typically disposed near the trailing end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew can cause the phenomenon that signals already written on one or more tracks in the neighborhood of a track targeted for writing are erased or attenuated during writing of a signal on the track targeted for writing. In the present application, this phenomenon will be called unwanted erasure. Unwanted erasure includes adjacent track erasure (ATE) and wide-area track erasure (WATE). To achieve higher recording density, it is necessary to prevent unwanted erasure.

A known technique for preventing unwanted erasure induced by the skew is to shape the main pole such that its end face located in the medium facing surface decreases in width with increasing proximity to the top surface of the substrate, as disclosed in U.S. Pat. Nos. 8,270,110 B2 and 8,289,649 B2, for example.

U.S. Pat. Nos. 8,270,110 B2 and 8,289,649 B2 also disclose other effective techniques for preventing unwanted erasure induced by the skew. One of such techniques is to provide two side shields on opposite sides of the main pole in the track width direction, and another one is to provide a shield having an end face that is located in the medium facing surface and wraps around the end face of the main pole (such a shield will hereinafter be referred to as a wrap-around shield). The wrap-around shield includes a bottom shield located on the air-inflow-end side relative to the main pole, a top shield located on the air-outflow-end side relative to the main pole, and two side shields located on opposite sides of the main pole in the track width direction. These techniques allow for capturing a magnetic flux that is produced from the end face of the main pole and spreads in the track width direction. Thus, the occurrence of unwanted erasure can be prevented by these techniques.

A main pole that is shaped such that its end face located in the medium facing surface decreases in width with increasing proximity to the top surface of the substrate has a disadvantage as described below. If a main pole of such a shape is formed by a conventional method of forming a main pole, major part of the side surface of the main pole along the entire perimeter of the main pole will be formed into a slope inclined relative to a direction perpendicular to the top surface of the substrate. In such a case, the main pole has a smaller cross-sectional area perpendicular to the direction in which magnetic flux flows, when compared with a case where the entire side surface of the main pole is perpendicular to the top surface of the substrate. The main pole of the foregoing shape is unable to allow much magnetic flux to pass therethrough, especially through a portion near the boundary between a track width defining portion and a wide portion wider than the track width defining portion, and this will result in degradation of write characteristics such as overwrite property.

An effective technique for solving the foregoing problem is, as disclosed in U.S. Pat. No. 8,289,649 B2, to form the main pole into the following particular shape. The main pole formed by the technique disclosed therein has six side surfaces: first and second side surfaces that are opposite to each other and located in a first region extending from the medium facing surface to a position at a predetermined distance from the medium facing surface; third and fourth side surfaces that are located in a second region other than the first region; a fifth side surface located in the boundary between the first and second regions and connecting the first side surface to the third side surface; and a sixth side surface located in the boundary between the first and second regions and connecting the second side surface to the fourth side surface. The distance between the first side surface and the second side surface in the track width direction decreases with increasing proximity to the top surface of the substrate. In the boundary between the first region and the second region, the distance between the third side surface and the fourth side surface in the track width direction when seen at the position closest to the top surface of the substrate is greater than the distance between the first side surface and the second side surface in the track width direction when seen at the position closest to the top surface of the substrate. Each of the fifth and sixth side surfaces has a width that increases with decreasing distance to the top surface of the substrate. This technique allows the main pole to have a large cross-sectional area perpendicular to the direction of flow of magnetic flux in the vicinity of the boundary between the track width defining portion and the wide portion, so that much magnetic flux can pass therethrough. This makes it possible to improve write characteristics such as overwrite property.

Conventionally, however, manufacturing a magnetic head having a main pole shaped as described above and two side shields requires a large number of steps and much time for determining the shapes of the main pole and the two side shields, and thus raises the cost of manufacturing the magnetic head.

OBJECT AND SUMMARY OF THE INVENTION

It is an object of the present invention to provide a magnetic head for perpendicular magnetic recording having a main pole and two side shields and a manufacturing method therefor, the magnetic head and the manufacturing method achieving prevention of unwanted erasure and improved write characteristics at the same time and allowing for easy determination of the shapes of the main pole and the two side shields.

A magnetic head for perpendicular magnetic recording of the present invention includes a medium facing surface facing a recording medium, a coil, a main pole, a write shield formed of a magnetic material, a gap part, a nonmagnetic layer formed of a nonmagnetic material, and a substrate having a top surface. The coil produces a magnetic field corresponding to data to be written on the recording medium, The main pole allows a magnetic flux corresponding to the magnetic field produced by the coil to pass, and produces a write magnetic field for writing data on the recording medium by means of a perpendicular magnetic recording system. The gap part is formed of a nonmagnetic material and provided between the main pole and the write shield. The coil, the main pole, the write shield, the gap part, and the nonmagnetic layer are disposed above the top surface of the substrate.

The main pole has an end face located in the medium facing surface, a top surface farthest from the top surface of the substrate, a bottom end opposite to the top surface, and first through sixth side surfaces. The end face of the main pole has a first side located at an end of the top surface of the main pole, and has a second side and a third side opposite to each other in the track width direction. The distance between the second side and the third side in the track width direction decreases with increasing proximity to the top surface of the substrate.

The first side surface is connected to the second side. The second side surface is located farther from the medium facing surface than is the first side surface. The fifth side surface connects the first side surface to the second side surface. The third side surface is connected to the third side. The fourth side surface is located farther from the medium facing surface than is the third side surface. The sixth side surface connects the third side surface to the fourth side surface. Each of the fifth and sixth side surfaces is located at a distance of 50 to 500 nm from the medium facing surface. The distance between the first side surface and the third side surface in the track width direction decreases with increasing proximity to the top surface of the substrate.

The fifth side surface has a first edge located at the boundary between the first side surface and the fifth side surface, and a second edge located at the boundary between the second side surface and the fifth side surface. The sixth side surface has a third edge located at the boundary between the third side surface and the sixth side surface, and a fourth edge located at the boundary between the fourth side surface and the sixth side surface. The distance between the second edge and the fourth edge at the position closest to the top surface of the substrate is greater than the distance between the first edge and the third edge at the position closest to the top surface of the substrate. Each of the fifth and sixth side surfaces has a width that increases with increasing proximity to the top surface of the substrate.

The write shield includes a first side shield and a second side shield located on opposite sides of the main pole in the track width direction. The first side shield has an end face located in the medium facing surface, and has a first sidewall and a second sidewall. The second side shield has an end face located in the medium facing surface, and has a third sidewall and a fourth sidewall. The first sidewall is opposed to the first side surface of the main pole. The second sidewall is located farther from the medium facing surface than is the first sidewall. The third sidewall is opposed to the third side surface of the main pole. The fourth sidewall is located farther from the medium facing surface than is the third sidewall. The distance between the first sidewall and the third sidewall in the track width direction decreases with increasing proximity to the top surface of the substrate. The distance between the second sidewall and the fourth sidewall in the track width direction decreases with increasing proximity to the top surface of the substrate.

The nonmagnetic layer includes a first portion located between the second side surface of the main pole and the second sidewall, and a second portion located between the fourth side surface of the main pole and the fourth sidewall. The gap part includes a first gap layer provided along the first sidewall and the third sidewall. No part of the nonmagnetic layer is present between the first gap layer and the first side surface of the main pole and between the first gap layer and the third side surface of the main pole. The first portion is in contact with the second edge of the fifth side surface. The second portion is in contact with the fourth edge of the sixth side surface. The distance between the second side surface of the main pole and the second sidewall is greater than the distance between the first side surface of the main pole and the first sidewall. The distance between the fourth side surface of the main pole and the fourth sidewall is greater than the distance between the third side surface of the main pole and the third sidewall.

A method of manufacturing the magnetic head for perpendicular magnetic recording of the present invention includes the steps of: forming the first and second side shields; forming the first gap layer after the first and second side shields are formed; forming a mold by photolithography after the first gap layer is formed, the mold having a first inner wall defining a shape of the second side surface of the main pole and a second inner wall defining a shape of the fourth side surface of the main pole; forming the main pole after the mold is formed; removing the mold after the main pole is formed; forming the nonmagnetic layer after the mold is removed; and forming the coil.

In the method of manufacturing the magnetic head for perpendicular magnetic recording of the present invention, a receiving portion for receiving the main pole is formed by the first side shield, the second side shield, the first gap layer and the mold in the step of forming the mold. In the step of forming the main pole, the main pole is formed in the receiving portion, and shapes of the first and third side surfaces of the main pole are defined by the first sidewall of the first side shield, the third sidewall of the second side shield and the first gap layer, while the shape of the second side surface of the main pole and the shape of the fourth side surface of the main pole are defined by the first inner wall of the mold and the second inner wall of the mold, respectively.

In the magnetic head for perpendicular magnetic recording and the method of manufacturing the same of the present invention, the write shield may further include a bottom shield and a top shield. The bottom shield has a top surface, and an end face that is located in the medium facing surface at a position on the rear side in the direction of travel of the recording medium relative to the end face of the main pole. The top shield has an end face that is located in the medium facing surface at a position on the front side in the direction of travel of the recording medium relative to the end face of the main pole. The gap part further includes a second gap layer located between the main pole and the top shield. In this case, the method of manufacturing the magnetic head for perpendicular magnetic recording of the present invention further includes the steps of: forming the bottom shield before the first and second side shields are formed; forming the second gap layer after the main pole is formed; and forming the top shield after the second gap layer is formed.

Further, in the magnetic head for perpendicular magnetic recording and the method of manufacturing the same of the present invention, the first side shield may further have a fifth sidewall connecting the first sidewall to the second sidewall, while the second side shield may further have a sixth sidewall connecting the third sidewall to the fourth sidewall.

In the magnetic head for perpendicular magnetic recording and the method of manufacturing the same of the present invention, the main pole has the first through sixth side surfaces defined as above, and the write shield includes the first and second side shields. These features of the present invention make it possible to prevent unwanted erasure and improve write characteristics at the same time. Further, the present invention allows the shapes of the first and third side surfaces of the main pole to be defined by the first sidewall of the first side shield, the third sidewall of the second side shield and the first gap layer, and allows the shapes of the second and fourth side surfaces of the main pole to be defined independently of the second sidewall of the first side shield and the fourth sidewall of the second side shield. Consequently, the present invention provides a magnetic head that achieves prevention of unwanted erasure and improved write characteristics at the same time and has a main pole and two side shields whose shapes are easily determinable.

Other and further objects, features and advantages of the present invention will appear more fully from the following description.

DETAILED DESCRIPTION OF THE PREFERRED EMBODIMENTS

First Embodiment

Figure 6:
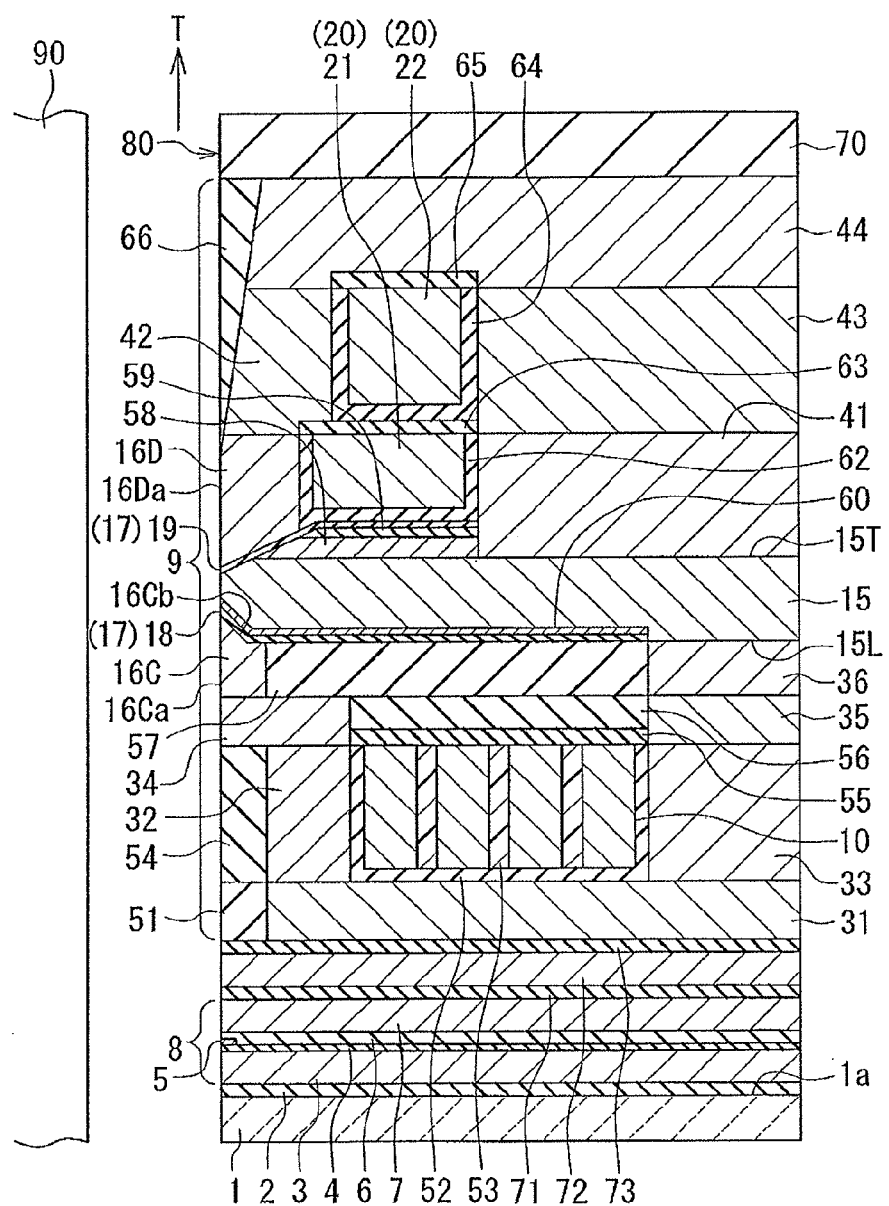
FIG. 6 is a cross-sectional view showing the configuration of the magnetic head according to the first embodiment of the invention.
Figure 7:
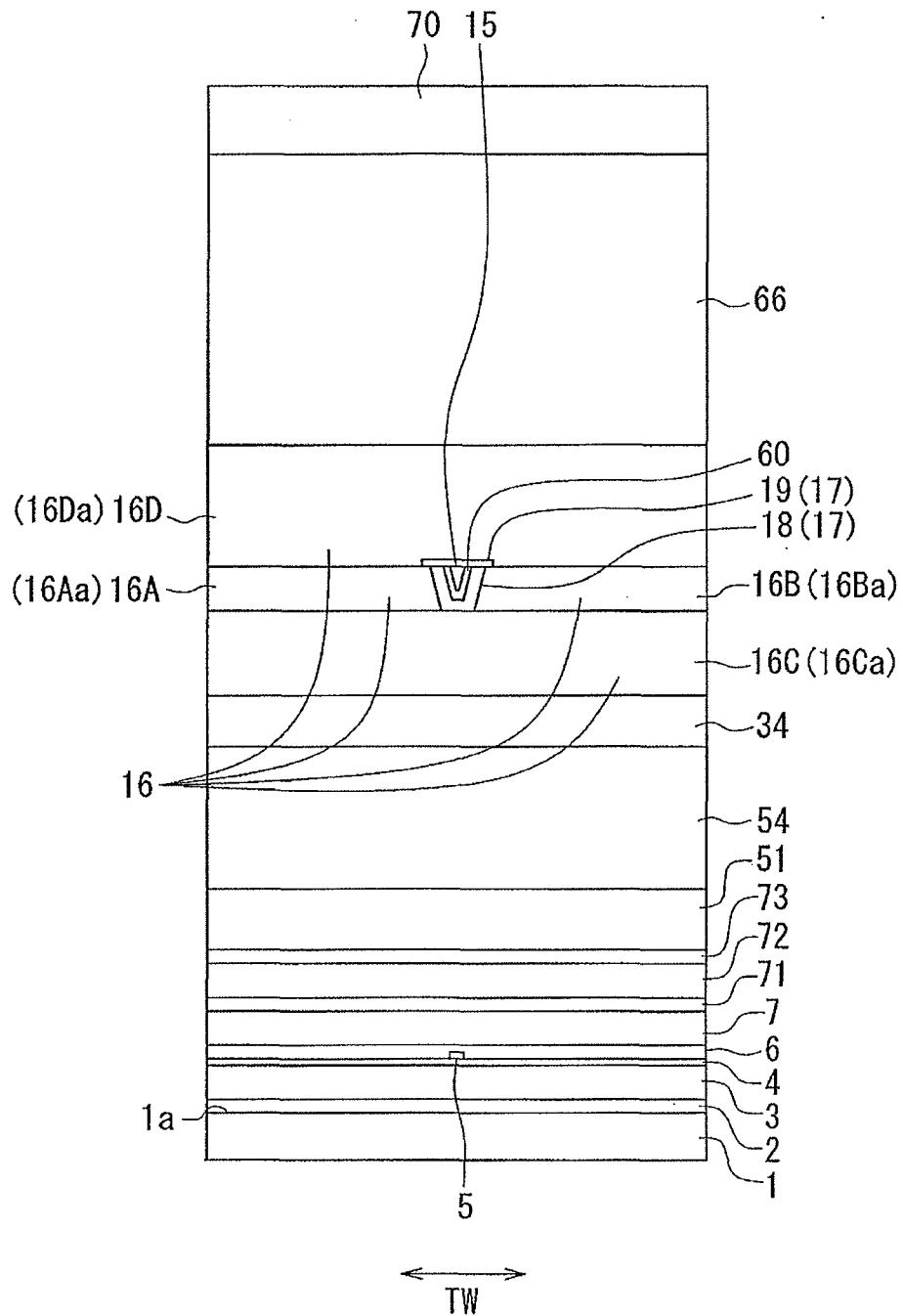
FIG. 7 is a front view showing the medium facing surface of the magnetic head according to the first embodiment of the invention.
Figure 8:
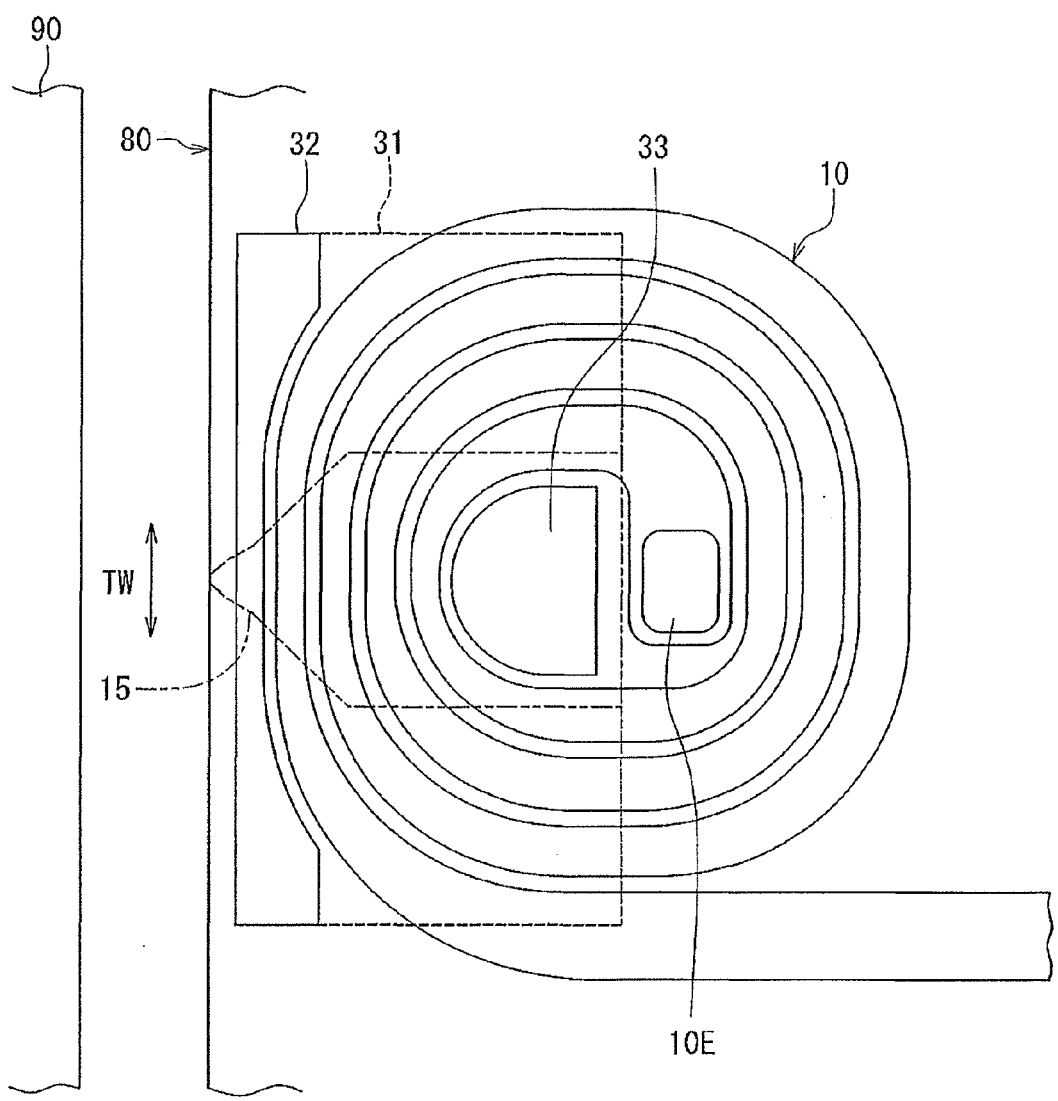
FIG. 8 is a plan view showing a first portion of a coil of the magnetic head according to the first embodiment of the invention.
Figure 9:
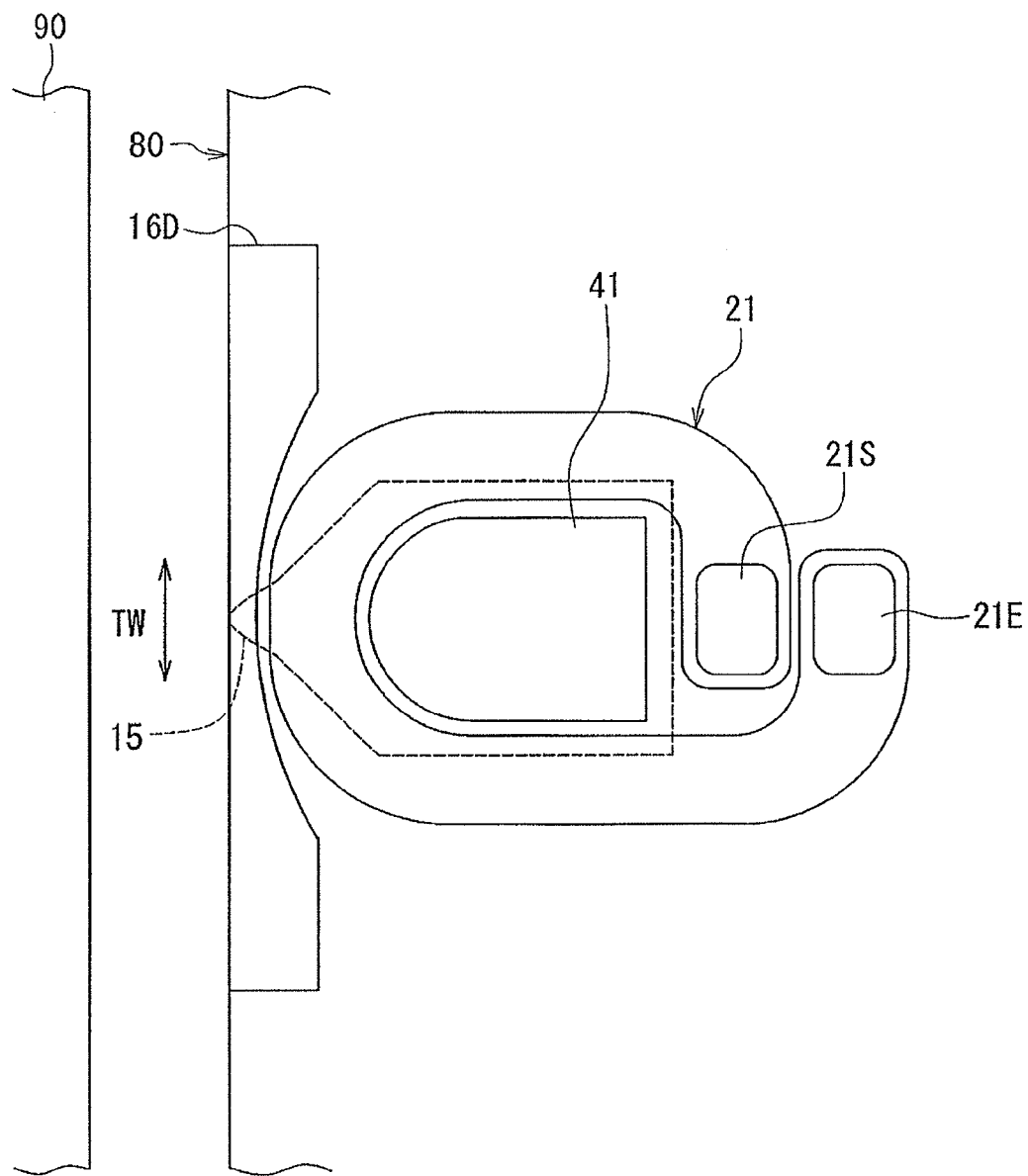
FIG. 9 is a plan view showing a first layer of a second portion of the coil of the magnetic head according to the first embodiment of the invention.
Figure 10:
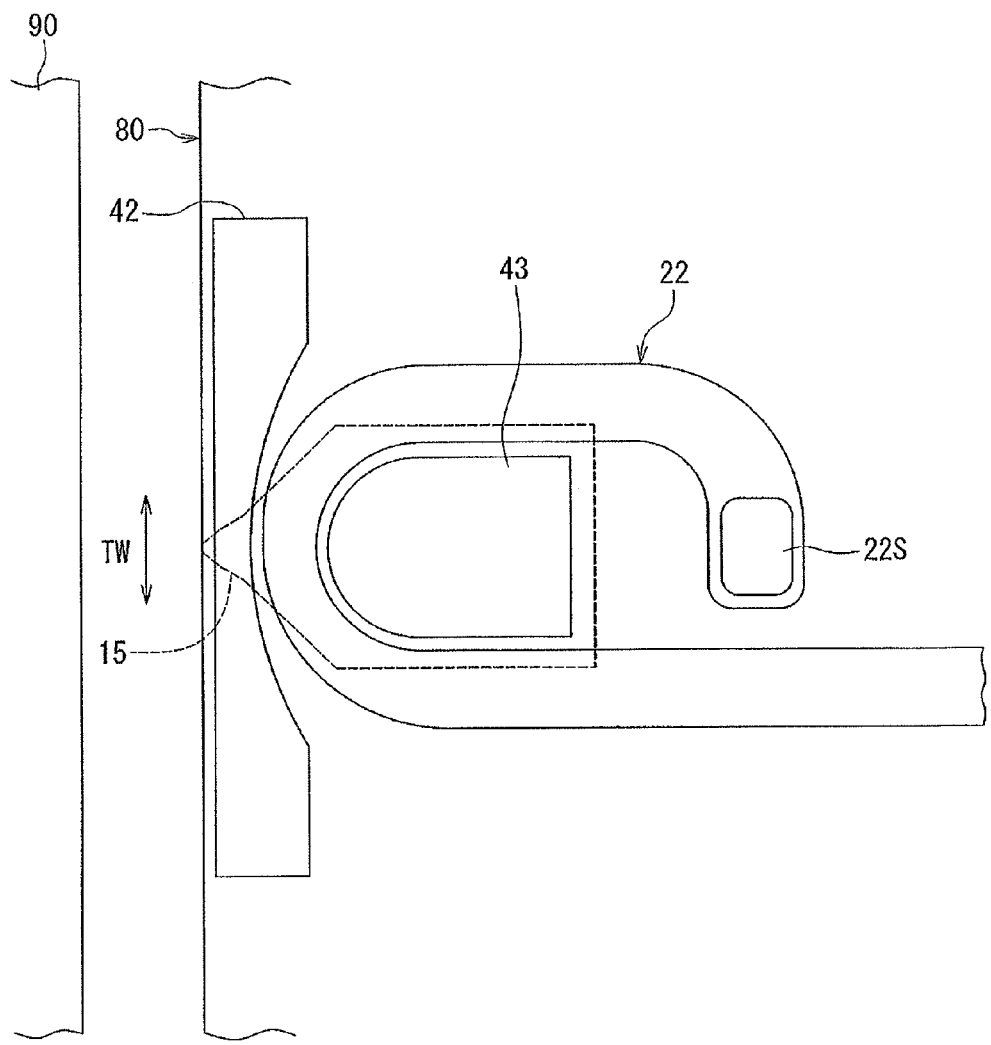
FIG. 10 is a plan view showing a second layer of the second portion of the coil of the magnetic head according to the first embodiment of the invention.

Preferred embodiments of the present invention will now be described in detail with reference to the drawings. First, reference is made to FIG. 6 to FIG. 10 to describe the configuration of a magnetic head according to a first embodiment of the invention. FIG. 6 is a cross-sectional view showing the configuration of the magnetic head according to the present embodiment. FIG. 6 shows a cross section perpendicular to the medium facing surface and to the top surface of the substrate. The arrow with the symbol T in FIG. 6 indicates the direction of travel of a recording medium. FIG. 7 is a front view showing the medium facing surface of the magnetic head according to the present embodiment. FIG. 8 is a plan view showing a first portion of a coil of the magnetic head according to the present embodiment. FIG. 9 is a plan view showing a first layer of a second portion of the coil of the magnetic head according to the present embodiment. FIG. 10 is a plan view showing a second layer of the second portion of the coil of the magnetic head according to the present embodiment. In each of FIG. 7 to FIG. 10, the arrow with the symbol TW indicates the track width direction.

As shown in FIG. 6, the magnetic head for perpendicular magnetic recording (hereinafter simply referred to as the magnetic head) according to the present embodiment has a medium facing surface 80 facing a recording medium 90. Further, as shown in FIG. 6 and FIG. 7, the magnetic head includes a substrate 1 formed of a ceramic material such as aluminum oxide-titanium carbide ($Al_2O_3$—TiC) and having a top surface 1a, an insulating layer 2 formed of an insulating material such as alumina ($Al_2O_3$) and disposed on the top surface 1a of the substrate 1, a first read shield layer 3 formed of a magnetic material and disposed on the insulating layer 2, a first read shield gap film 4 which is an insulating film disposed to cover the first read shield layer 3, a magnetoresistive (MR) element 5 serving as a read element disposed on the first read shield gap film 4, a second read shield gap film 6 which is an insulating film disposed on the MR element 5, and a second read shield layer 7 formed of a magnetic material and disposed on the second read shield gap film 6.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element.

The parts from the first read shield layer 3 to the second read shield layer 7 constitute a read head unit 8. The magnetic head further includes a nonmagnetic layer 71 formed of a nonmagnetic material and disposed on the second read shield layer 7, a middle shield layer 72 formed of a magnetic material and disposed on the nonmagnetic layer 71, a nonmagnetic layer 73 formed of a nonmagnetic material and disposed on the middle shield layer 72, and a write head unit 9 disposed on the nonmagnetic layer 73. The middle shield layer 72 has the function of shielding the MR element 5 from magnetic fields generated in the write head unit 9. The nonmagnetic layers 71 and 73 are formed of alumina, for example.

Figure 1:
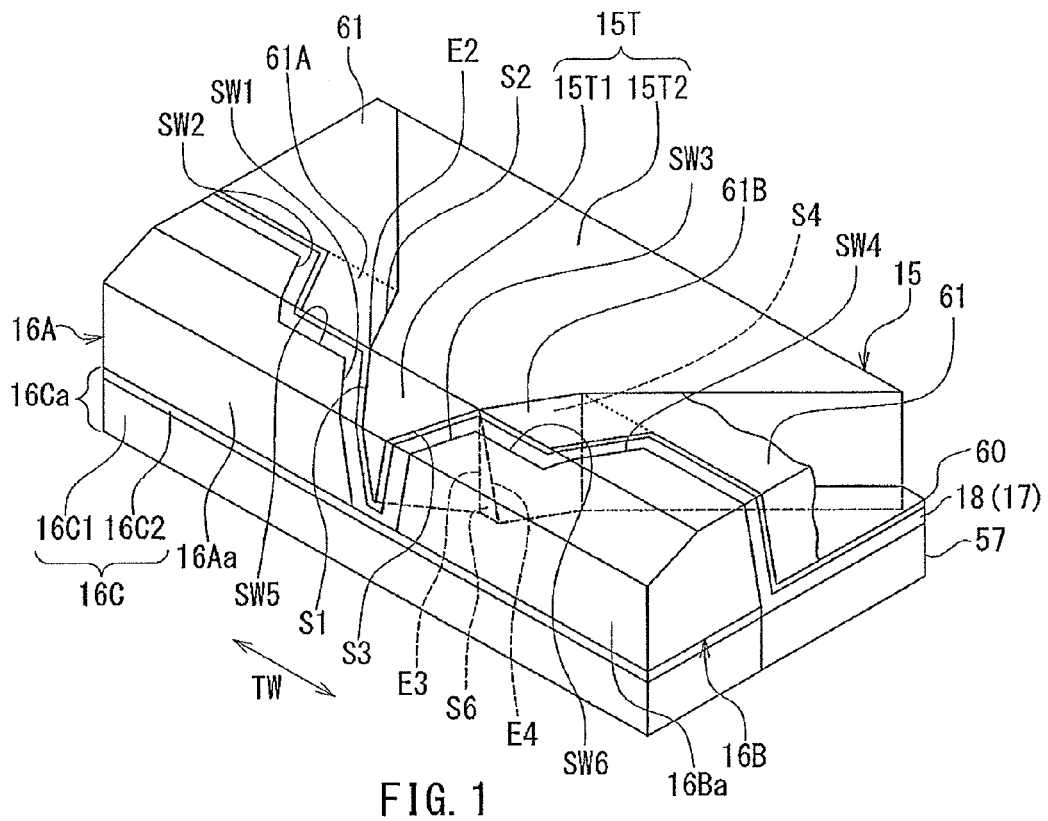
FIG. 1 is a perspective view of a main pole and two side shields of a magnetic head according to a first embodiment of the invention in an area near the medium facing surface.
Figure 3:
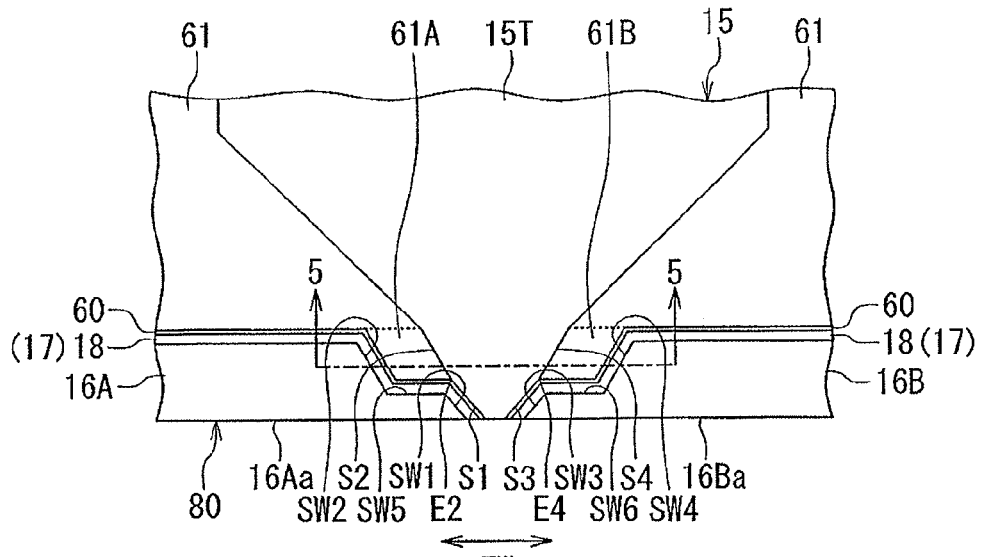
FIG. 3 is a plan view of the main pole and the two side shields of the first embodiment of the invention in the area near the medium facing surface.
Figure 5:
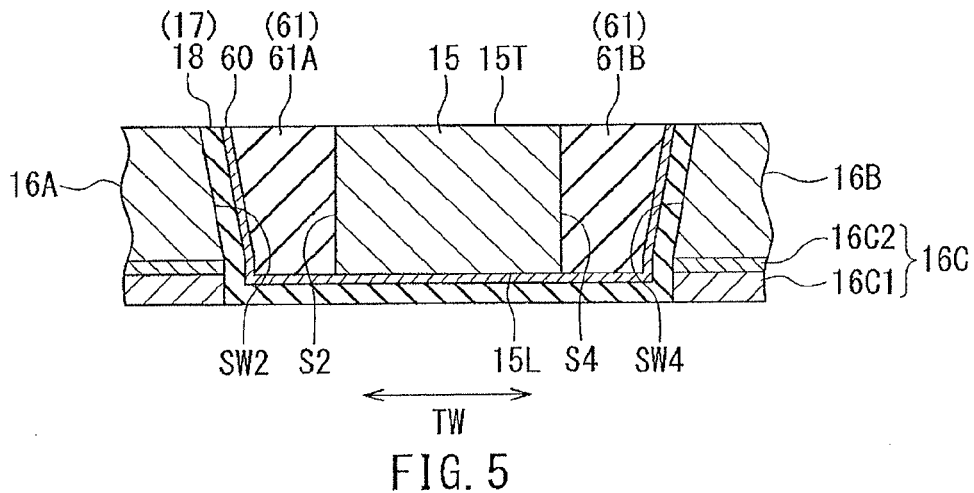
FIG. 5 is a cross-sectional view showing cross sections of the main pole and the two side shields taken along line 5-5 of FIG. 3.

The write head unit 9 includes a coil, a main pole 15, a write shield 16, a gap part 17, and a nonmagnetic layer 61. The nonmagnetic layer 61 is shown in FIG. 1, FIG. 3 and FIG. 5 which will be described later. The coil produces a magnetic field corresponding to data to be written on the recording medium 90. The coil includes a first portion 10 and a second portion 20. The first portion 10 and the second portion 20 are both formed of a conductive material such as copper. The first portion 10 and the second portion 20 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium 90 by means of a perpendicular magnetic recording system. FIG. 6 shows a cross section that intersects the end face of the main pole 15 located in the medium facing surface 80 and that is perpendicular to the medium facing surface 80 and to the top surface 1a of the substrate 1.

As shown in FIG. 7, the write shield 16 includes a first side shield 16A, a second side shield 16B, a bottom shield 16C, and a top shield 16D. The first and second side shields 16A and 16B are located on opposite sides of the main pole 15 in the track width direction TW. The bottom shield 16C is located on the rear side in the direction T of travel of the recording medium 90 relative to the main pole 15. The top shield 16D is located on the front side in the direction T of travel of the recording medium 90 relative to the main pole 15. The side shields 16A and 16B magnetically couple the bottom shield 16C to the top shield 16D.

As shown in FIG. 7, the first side shield 16A has an end face 16Aa located in the medium facing surface 80. The second side shield 16B has an end face 16Ba located in the medium facing surface 80. As shown in FIG. 6 and FIG. 7, the bottom shield 16C has an end face 16Ca located in the medium facing surface 80 and a top surface 16Cb including an inclined portion. The distance from the medium facing surface 80 to an arbitrary point on the inclined portion decreases with increasing distance from the arbitrary point to the top surface 1a of the substrate 1. The top shield 16D has an end face 16Da located in the medium facing surface 80, a bottom surface, a top surface, and a connecting surface connecting the end face 16Da to the top surface. The distance from the medium facing surface 80 to an arbitrary point on the bottom surface increases with increasing distance from the arbitrary point to the top surface 1a of the substrate 1, The distance from the medium facing surface 80 to an arbitrary point on the connecting surface increases with increasing distance from the arbitrary point to the top surface 1a of the substrate 1.

The end faces 16Aa and 16Ba are located on opposite sides of the end face of the main pole 15 in the track width direction TW. The end face 16Ca is located on the rear side in the direction T of travel of the recording medium 90 relative to the end face of the main pole 15. The end face 16Da is located on the front side in the direction T of travel of the recording medium 90 relative to the end face of the main pole 15. In the medium facing surface 80, the end faces 16Aa, 16Ba, 16Ca and 16Da are arranged to wrap around the end face of the main pole 15.

The write shield 16 is formed of a magnetic material. The material employed for the write shield 16 may be CoFeN, CoNiFe, NiFe, or CoFe, for example.

The write head unit 9 further includes magnetic layers 31 to 36 and 41 to 44. Each of the magnetic layers 31 to 36 and 41 to 44 is formed of a magnetic material. The material employed for each of the magnetic layers 31 to 36 and 41 to 44 may be CoFeN, CoNiFe, NiFe, or CoFe, for example. The magnetic layer 31 lies on the nonmagnetic layer 73. The magnetic layers 32 and 33 both lie on the magnetic layer 31. The magnetic layer 32 is located near the medium facing surface 80. The magnetic layer 33 is located farther from the medium facing surface 80 than is the magnetic layer 32. Each of the magnetic layers 31 and 32 has an end face that faces toward the medium facing surface 80 and that is located at a distance from the medium facing surface 80. As shown in FIG. 8, the first portion 10 of the coil is wound approximately four turns around the magnetic layer 33.

The magnetic head further includes: an insulating layer 51 formed of an insulating material, disposed on the nonmagnetic layer 73 and surrounding the magnetic layer 31; an insulating film 52 formed of an insulating material and isolating the first portion 10 from the magnetic layers 31 to 33; an insulating layer 53 formed of an insulating material and disposed in the space between adjacent turns of the first portion 10; and an insulating layer 54 formed of an insulating material and disposed around the first portion 10 and the magnetic layer 32. The top surfaces of the first portion 10, the magnetic layers 32 and 33, the insulating film 52, and the insulating layers 53 and 54 are even with each other. The insulating layers 51 and 54 and the insulating film 52 are formed of alumina, for example. The insulating layer 53 is formed of a photoresist, for example.

The magnetic layer 34 lies on the magnetic layer 32 and the insulating layer 54. The magnetic layer 35 lies on the magnetic layer 33. The magnetic layer 34 has an end face located in the medium facing surface 80. The magnetic head further includes an insulating layer 55 formed of an insulating material and disposed over the top surfaces of the first portion 10, the insulating film 52 and the insulating layer 53 and 54, and an insulating layer 56 formed of an insulating material, disposed on the insulating layer 55 and surrounding the magnetic layers 34 and 35. The insulating layers 55 and 56 are formed of alumina, for example.

The bottom shield 16C lies on the magnetic layer 34. The magnetic layer 36 lies on the magnetic layer 35. The magnetic head further includes a nonmagnetic layer 57 formed of a nonmagnetic material. The nonmagnetic layer 57 lies on the top surface of the insulating layer 56 and part of the top surface of the magnetic layer 34, and surrounds the bottom shield 16C and the magnetic layer 36. The nonmagnetic layer 57 is formed of alumina, for example.

The first and second side shields 16A and 16B are disposed on the bottom shield 16C and in contact with the top surface 16Cb of the bottom shield 16C. The main pole 15 has a top surface 15T (see FIG. 6) farthest from the top surface 1a of the substrate 1, a bottom end 15L (see FIG. 6) opposite to the top surface 15T, and a plurality of side surfaces (see FIG. 8 to FIG. 10). Each of the first and second side shields 16A and 16B has a plurality of sidewalls. The plurality of side surfaces of the main pole 15 and the plurality of sidewalls of each of the first and second side shields 16A and 16B will be described in detail later.

As shown in FIG. 8 to FIG. 10, the main pole 15 may include a width changing portion having an end face located in the medium facing surface 80 and an end opposite thereto, and a constant width portion connected to the end of the width changing portion. In the width changing portion, the width in the track width direction TW of the top surface 15T gradually increases with increasing distance from the medium facing surface 80. In the constant width portion, the width in the track width direction TW of the top surface 15T is constant regardless of the distance from the medium facing surface 80. The width in the track width direction TW of the top surface 15T in the width changing portion and that in the constant width portion are equal at the boundary between the width changing portion and the constant width portion. The end face of the width changing portion located in the medium facing surface 80 also serves as the end face of the main pole 15 located in the medium facing surface 80.

The main pole 15 may further include a track width defining portion located between the width changing portion and the medium facing surface 80. In the track width defining portion, the width in the track width direction TW of the top surface 15T is generally constant regardless of the distance from the medium facing surface 80. The width in the track width direction TW of the top surface 15T in the track width defining portion and that in the width changing portion are equal at the boundary between the track width defining portion and the width changing portion.

The gap part 17 is formed of a nonmagnetic material and provided between the main pole 15 and the write shield 16. The gap part 17 includes a first gap layer 18 including a portion located between the main pole 15 and each of the side and bottom shields 16A, 16B and 16C, and a second gap layer 19 including a portion located between the main pole 15 and the top shield 16D.

The first gap layer 18 is provided along the sidewalls of the first and second side shields 16A and 16B, the top surface 16Cb of the bottom shield 16C and the top surface of the nonmagnetic layer 57. The first gap layer 18 is formed of a nonmagnetic material. The nonmagnetic material used to form the first gap layer 18 may be an insulating material or a nonmagnetic metal material. Alumina is an example of an insulating material that can be used to form the first gap layer 18. Ru is an example of a nonmagnetic metal material that can be used to form the first gap layer 18. The first gap layer 18 has a thickness in the range of 40 to 100 nm, for example.

The magnetic head further includes a seed layer 60 provided along the surface of the first gap layer 18. The seed layer 60 is formed of a metal material. The metal material used to form the seed layer 60 may be a nonmagnetic metal material or a magnetic metal material. Ru is an example of a nonmagnetic metal material that can be used to form the seed layer 60. NiFe, CoNiFe, and CoFe are examples of magnetic metal materials that can be used to form the seed layer 60. The seed layer 60 is used as an electrode and a seed layer when forming the main pole 15 by plating. The seed layer 60 has a thickness in the range of 40 to 60 nm, for example. The first gap layer 18 and the seed layer 60 have openings for exposing the top surface of the magnetic layer 36.

The main pole 15 is disposed over the bottom shield 16C and the nonmagnetic layer 57 such that the first gap layer 18 and the seed layer 60 are interposed between the main pole 15 and each of the top surface 16Cb of the bottom shield 16C and the top surface of the nonmagnetic layer 57. As shown in FIG. 7, the first gap layer 18 and the seed layer 60 are interposed also between the main pole 15 and each of the first and second side shields 16A and 16B.

At a position away from the medium facing surface 80, the bottom end 15L of the main pole 15 is in contact with the top surface of the magnetic layer 36. The main pole 15 is formed of a magnetic metal material. The material employed for the main pole 15 may be NiFe, CoNiFe, or CoFe, for example.

The nonmagnetic layer 61 is formed of a nonmagnetic material and surrounds the main pole 15 and the side shields 16A and 16B. In the present embodiment, the nonmagnetic layer 61 is formed of a nonmagnetic insulating material such as alumina, in particular. The nonmagnetic layer 61 will be described in detail layer.

The magnetic head further includes a nonmagnetic metal layer 58 formed of a nonmagnetic metal material, located away from the medium facing surface 80 and lying on part of the top surface 15T of the main pole 15, and an insulating layer 59 formed of an insulating material and lying on the top surface of the nonmagnetic metal layer 58. The nonmagnetic metal layer 58 is formed of Ru, NiCr, or NiCu, for example. The insulating layer 59 is formed of alumina, for example.

The second gap layer 19 is disposed to cover the main pole 15, the nonmagnetic metal layer 58 and the insulating layer 59. The material used to form the second gap layer 19 may be a nonmagnetic insulating material such as alumina or a nonmagnetic conductive material such as Ru, NiCu, Ta, W, NiB, or NiP.

The top shield 16D is disposed over the side shields 16A and 16B and the second gap layer 19, and in contact with the top surfaces of the side shields 16A and 16B and the second gap layer 19. In the medium facing surface 80, part of the end face 16Da of the top shield 16D is spaced from the end face of the main pole 15 by a predetermined distance created by the thickness of the second gap layer 19. The thickness of the second gap layer 19 preferably falls within the range of 5 to 60 nm, and may be 30 to 60 nm, for example.

The magnetic layer 41 is located away from the medium facing surface 80 and lies on the main pole 15. The second portion 20 of the coil includes a first layer 21 and a second layer 22. As shown in FIG. 9, the first layer 21 is wound one turn around the magnetic layer 41. The magnetic head further includes an insulating film 62 isolating the first layer 21 from the top shield 16D, the second gap layer 19 and the magnetic layer 41, and a first nonmagnetic layer (not illustrated) formed of a nonmagnetic material and disposed around the first layer 21 and the top shield 16D. The insulating film 62 and the first nonmagnetic layer are formed of alumina, for example. The top surfaces of the top shield 16D, the first layer 21, the magnetic layer 41, the insulating film 62 and the first nonmagnetic layer are even with each other.

The magnetic head further includes an insulating layer 63 formed of an insulating material and disposed over the top surfaces of the first layer 21 and the insulating film 62. The insulating layer 63 is formed of alumina, for example.

The magnetic layer 42 lies on the top shield 16D and the insulating layer 63. The magnetic layer 42 has an end face that faces toward the medium facing surface 80 and that is located at a distance from the medium facing surface 80. The distance from the medium facing surface 80 to an arbitrary point on the end face of the magnetic layer 42 increases with increasing distance from the arbitrary point to the top surface 1a of the substrate 1.

The magnetic layer 43 lies on the magnetic layer 41. As shown in FIG. 10, the second layer 22 is wound approximately one turn around the magnetic layer 43. The magnetic head further includes an insulating film 64 formed of an insulating material and isolating the second layer 22 from the magnetic layers 42 and 43 and the insulating layer 63, and a second nonmagnetic layer (not illustrated) formed of a nonmagnetic material and disposed around the second layer 22 and the magnetic layer 42. The insulating film 64 and the second nonmagnetic layer are formed of alumina, for example. The top surfaces of the second layer 22, the magnetic layers 42 and 43, the insulating film 64 and the second nonmagnetic layer are even with each other. The magnetic head further includes an insulating layer 65 formed of an insulating material and disposed over the top surfaces of the second layer 22 and the insulating film 64. The insulating layer 65 is formed of alumina, for example.

The magnetic layer 44 lies on the magnetic layers 42 and 43 and the insulating layer 65, and connects the magnetic layer 42 to the magnetic layer 43. The magnetic layer 44 has an end face that faces toward the medium facing surface 80 and that is located at a distance from the medium facing surface 80. The distance from the medium facing surface 80 to an arbitrary point on the end face of the magnetic layer 44 increases with increasing distance from the arbitrary point to the top surface 1a of the substrate 1.

The magnetic head further includes a nonmagnetic layer 66 formed of a nonmagnetic material and disposed around the magnetic layer 44, and a protective layer 70 formed of a nonmagnetic material and disposed to cover the write head unit 9. Part of the nonmagnetic layer 66 is interposed between the medium facing surface 80 and each of the connecting surface of the top shield 16D and the respective end faces of the magnetic layers 42 and 44 facing toward the medium facing surface 80. The nonmagnetic layer 66 and the protective layer 70 are formed of alumina, for example.

As has been described, the magnetic head according to the present embodiment includes the medium facing surface 80, the read head unit 8, and write head unit 9. The read head unit 8 and the write head unit 9 are stacked on the substrate 1. The read head unit 8 is located on the rear side in the direction T of travel of the recording medium 90, i.e., the leading side, relative to the write head unit 9.

The write head unit 9 includes the coil including the first and second portions 10 and 20, the main pole 15, the write shield 16, the gap part 17, the magnetic layers 31 to 36 and 41 to 44, and the nonmagnetic layer 61. The coil, the main pole 15, the write shield 16, the gap part 17 and the nonmagnetic layer 61 are disposed above the top surface 1a of the substrate 1. The write shield 16 includes the first side shield 16A, the second side shield 16B, the bottom shield 16C, and the top shield 16D. The gap part 17 includes the first gap layer 18 and the second gap layer 19.

The magnetic layers 31 to 36 are located on the rear side in the direction T of travel of the recording medium 90 relative to the main pole 15 and constitute a first return path section. As shown in FIG. 6, the first return path section (the magnetic layers 31 to 36) connects the write shield 16 and part of the main pole 15 located away from the medium facing surface 80 to each other so that a first space is defined by the main pole 15, the gap part 17 (the gap layer 18), the write shield 16, and the first return path section. The first portion 10 of the coil passes through the first space.

The magnetic layers 41 to 44 are located on the front side in the direction T of travel of the recording medium 90 relative to the main pole 15 and constitute a second return path section. The second return path section (the magnetic layers 41 to 44) connects the write shield 16 and part of the main pole 15 located away from the medium facing surface 80 to each other so that a second space is defined by the main pole 15, the gap part 17 (the gap layer 19), the write shield 16, and the second return path section. The second portion 20 of the coil passes through the second space.

The write shield 16 captures a disturbance magnetic field applied to the magnetic head from the outside thereof. This makes it possible to prevent the disturbance magnetic field from being intensively captured into the main pole 15 and thereby causing erroneous writing on the recording medium 90. The write shield 16 also has the function of capturing a magnetic flux produced from the end face of the main pole 15 and spreading in directions other than the direction perpendicular to the plane of the recording medium 90, so as to prevent the magnetic flux from reaching the recording medium 90. Furthermore, the write shield 16, the first return path section (the magnetic layers 31 to 36) and the second return path section (the magnetic layers 41 to 44) have the function of allowing a magnetic flux that has been produced from the end face of the main pole 15 and has magnetized the recording medium 90 to flow back.

The first and second portions 10 and 20 of the coil will now be described in detail with reference to FIG. 8 to FIG. 10. FIG. 8 is a plan view showing the first portion 10. The first portion 10 is wound approximately four turns around the magnetic layer 33. The first portion 10 includes a portion that extends to pass between the magnetic layer 32 and the magnetic layer 33, in particular, within the first space. The first portion 10 has a coil connection 10E electrically connected to the second portion 20.

FIG. 9 is a plan view showing the first layer 21 of the second portion 20. The first layer 21 is wound one turn around the magnetic layer 41. The first layer 21 includes a portion that extends to pass between the top shield 16D and the magnetic layer 41, in particular, within the second space. The first layer 21 has a coil connection 21S electrically connected to the coil connection 10E of the first portion 10, and a coil connection 21E electrically connected to the second layer 22. The coil connection 21S is electrically connected to the coil connection 10E via first through third connection layers of columnar shape (not illustrated) that penetrate a plurality of layers interposed between the first layer 21 and the first portion 10. The first through third connection layers are stacked in this order on the coil connection 10E. The coil connection 21S is disposed on the third connection layer. The first through third connection layers are each formed of a conductive material such as copper.

FIG. 10 is a plan view showing the second layer 22 of the second portion 20. The second layer 22 is wound approximately one turn around the magnetic layer 43. The second layer 22 includes a portion that extends to pass between the magnetic layer 42 and the magnetic layer 43, in particular, within the second space. The second layer 22 has a coil connection 22S penetrating the insulating layer 63 and the insulating film 64 and electrically connected to the coil connection 21E of the first layer 21. In the example shown in FIG. 8 to FIG. 10, the first portion 10 and the second portion 20 are connected in series.

The main pole 15, the first side shield 16A, the second side shield 16B and the nonmagnetic layer 61 will now be described in detail with reference to FIG. 1 to FIG. 7. FIG. 1 is a perspective view of the main pole 15 and the side shields 16A and 16B in an area near the medium facing surface 80.

Figure 2:
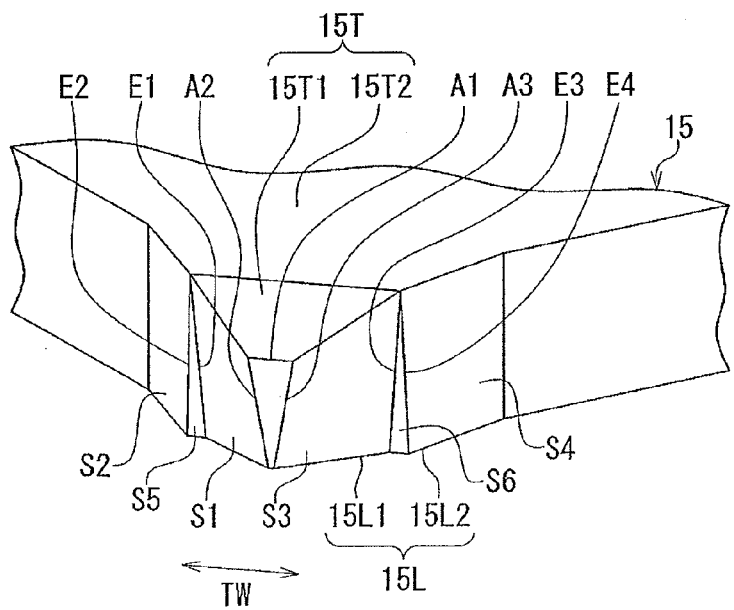
FIG. 2 is a perspective view of the main pole of the first embodiment of the invention in the area near the medium facing surface.
Figure 4:
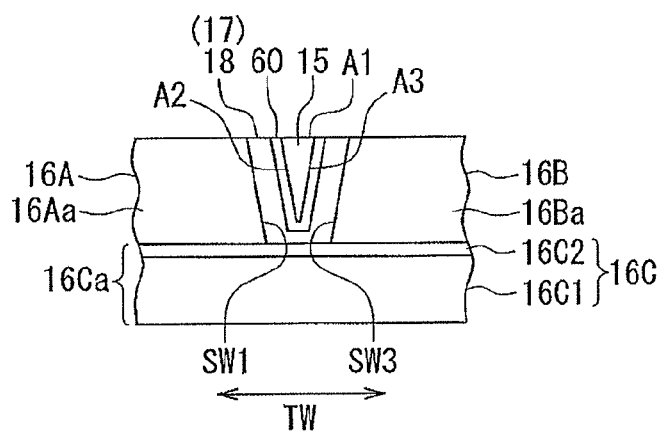
FIG. 4 is a front view showing respective end faces of the main pole and the two side shields located in the medium facing surface in the first embodiment of the invention.

FIG. 2 is a perspective view of the main pole 15 in the area near the medium facing surface 80. FIG. 3 is a plan view of the main pole 15 and the side shields 16A and 16B in the area near the medium facing surface 80. FIG. 4 is a front view showing the respective end faces of the main pole 15 and the side shields 16A and 16B located in the medium facing surface 80. FIG. 5 is a cross-sectional view showing cross sections of the main pole 15 and the side shields 16A and 16B taken along line 5-5 of FIG. 3.

As shown in FIG. 1 to FIG. 3 and FIG. 6, the main pole 15 has the end face located in the medium facing surface 80, the top surface 15T farthest from the top surface 1a of the substrate 1, the bottom end 15L opposite to the top surface 15T, and first through sixth side surfaces S1, S2, S3, S4, S5, and S6. As shown in FIG. 2, FIG. 4 and FIG. 7, the end face of the main pole 15 has a first side A1 located at an end of the top surface 15T, and has a second side A2 and a third side A3 opposite to each other in the track width direction TW. The first side A1 is in contact with the second gap layer 19. The distance between the second side A2 and the third side A3 in the track width direction TW decreases with increasing proximity to the top surface 1a of the substrate 1. Each of the second side A2 and the third side A3 forms an angle of, for example, 7° to 17°, or preferably 10° to 15°, with respect to a direction perpendicular to the top surface 1a of the substrate 1. The first side A1 has a length in the range of 0.05 to 0.20 µm, for example.

The end face of the seed layer 60 located in the medium facing surface 80 has two sides that are in contact with the second gap layer 19. Where the seed layer 60 is formed of a magnetic metal material, the track width is equal to the total length of the first side A1 and the aforementioned two sides of the end face of the seed layer 60. Where the seed layer 60 is formed of a nonmagnetic metal material, the track width is equal to the length of the first side A1.

As shown in FIG. 1 and FIG. 2, the top surface 15T includes an inclined portion 15T1 and a flat portion 15T2, the inclined portion 15T1 being closer to the medium facing surface 80. The inclined portion 15T1 has a first end located in the medium facing surface 80 and a second end opposite thereto. The flat portion 15T2 is connected to the second end of the inclined portion 15T1. The inclined portion 15T1 is inclined such that its second end is located on the front side in the direction T of travel of the recording medium 90 relative to its first end. The flat portion 15T2 extends in a direction substantially perpendicular to the medium facing surface 80. As shown in FIG. 6, the bottom surface of the top shield 16D includes a portion that is opposed to the inclined portion 15T1 with the second gap layer 19 interposed therebetween.

As shown in FIG. 2, the bottom 15L includes an inclined portion 15L1 and a flat portion 15L2, the inclined portion 15L1 being closer to the medium facing surface 80. The inclined portion 15L1 has a first end located in the medium facing surface 80 and a second end opposite thereto. The inclined portion 15L1 may be an edge formed by two intersecting planes, or may be a plane connecting two planes to each other. The flat portion 15L2 is a plane connected to the second end of the inclined portion 15L1. The inclined portion 15L1 is inclined such that its second end is located on the rear side in the direction T of travel of the recording medium 90 relative to its first end. The flat portion 15L2 extends in a direction substantially perpendicular to the medium facing surface 80.

As shown in FIG. 1, FIG. 4 and FIG. 5, the bottom shield 16C includes a first layer 16C1, and a second layer 16C2 lying on the first layer 16C1. The top surface 16Cb of the bottom shield 16C is formed by the top surface of the second layer 16C2. As shown in FIG. 6, the inclined portion of the top surface 16Cb of the bottom shield 16C (the top surface of the second layer 16C2) is opposed to the inclined portion 15L1 with the first gap layer 18 and the seed layer 60 interposed therebetween.

As shown in FIG. 2, the first side surface S1 is connected to the second side A2. The second side surface S2 is located farther from the medium facing surface 80 than is the first side surface S1. The fifth side surface S5 connects the first side surface S1 to the second side surface S2. The fifth side surface S5 has a first edge E1 located at the boundary between the first side surface S1 and the fifth side surface S5, and a second edge E2 located at the boundary between the second side surface S2 and the fifth side surface S5.

Further, as shown in FIG. 2, the third side surface S3 is connected to the third side A3. The fourth side surface S4 is located farther from the medium facing surface 80 than is the third side surface S3. The sixth side surface S6 connects the third side surface S3 to the fourth side surface S4. The sixth side surface S6 has a third edge E3 located at the boundary between the third side surface S3 and the sixth side surface S6, and a fourth edge E4 located at the boundary between the fourth side surface S4 and the sixth side surface S6.

Each of the fifth and sixth side surfaces S5 and S6 is located at a distance in the range of 50 to 500 nm from the medium facing surface 80. The distance from the medium facing surface 80 to an arbitrary point on the fifth side surface S5 falls within the aforementioned range and increases with decreasing distance from the arbitrary point to the top surface 1a of the substrate 1. The distance from the medium facing surface 80 to an arbitrary point on the sixth side surface S6 falls within the aforementioned range and increases with decreasing distance from the arbitrary point to the top surface 1a of the substrate 1.

FIG. 1 and FIG. 2 illustrate an example in which the distance from the medium facing surface 80 to the boundary between the inclined portion 15T1 and the flat portion 15T2 of the top surface 15T is equal to the distance from the medium facing surface 80 to each of the respective top ends of the fifth and sixth side surfaces S5 and S6. However, the distance from the medium facing surface 80 to the aforementioned boundary may be smaller or greater than the distance from the medium facing surface 80 to each of the aforementioned top ends.

Similarly, FIG. 2 illustrates an example in which the distance from the medium facing surface 80 to the boundary between the inclined portion 15L1 and the flat portion 15L2 of the bottom end 15L is equal to the distance from the medium facing surface 80 to each of the respective bottom ends of the fifth and sixth side surfaces S5 and S6. However, the distance from the medium facing surface 80 to the aforementioned boundary may be smaller or greater than the distance from the medium facing surface 80 to each of the aforementioned bottom ends.

The distance between the first side surface S1 and the third side surface S3 in the track width direction TW decreases with increasing proximity to the top surface 1a of the substrate 1. The distance between the second edge E2 and the fourth edge E4 at the position closest to the top surface 1a of the substrate 1 is greater than the distance between the first edge E1 and the third edge E3 at the position closest to the top surface 1a of the substrate 1. The width of each of the fifth side surface S5 and the sixth side surface S6 increases with increasing proximity to the top surface 1a of the substrate 1.

Each of the first side surface S1 and the third side surface S3 forms an angle of, for example, 7° to 17°, or preferably 10° to 15°, with respect to the direction perpendicular to the top surface 1a of the substrate 1.

The distance between the second side surface S2 and the fourth side surface S4 in the track width direction TW may be constant regardless of the distance from the top surface 1a of the substrate 1, or may decrease or increase with increasing proximity to the top surface 1a of the substrate 1.

When the distance between the second side surface S2 and the fourth side surface S4 in the track width direction TW is constant regardless of the distance from the top surface 1a of the substrate 1, both the second side surface S2 and the fourth side surface S4 form 0° with respect to the direction perpendicular to the top surface 1a of the substrate 1.

When the distance between the second side surface S2 and the fourth side surface S4 in the track width direction TW decreases with increasing proximity to the top surface 1a of the substrate 1, the second side surface S2 forms a smaller angle with respect to the direction perpendicular to the top surface 1a of the substrate 1 than does the first side surface S1, and the fourth side surface S4 forms a smaller angle with respect to the direction perpendicular to the top surface 1a of the substrate 1 than does the third side surface S3. Here, for the case where the distance between the side surfaces S2 and S4 in the track width direction TW decreases with increasing proximity to the top surface 1a of the substrate 1, the angle that each of the side surfaces S2 and S4 forms with respect to the direction perpendicular to the top surface 1a of the substrate 1 will be expressed in a positive value. For the case where the distance between the side surfaces S2 and S4 in the track width direction TW increases with increasing proximity to the top surface 1a of the substrate 1, the angle that each of the side surfaces S2 and S4 forms with respect to the direction perpendicular to the top surface 1a of the substrate 1 will be expressed in a negative value. In such cases, the angle that each of the side surfaces S2 and S4 forms with respect to the direction perpendicular to the top surface 1a of the substrate 1 may fall within the range of, for example, −7° to 7°, and preferably within the range of −7° to 0°.

As shown in FIG. 3, both the distance between the first side surface S1 and the third side surface S3 in the track width direction TW and the distance between the second side surface S2 and the fourth side surface S4 in the track width direction TW increase with increasing distance from the medium facing surface 80. When the main pole 15 includes the track width defining portion mentioned previously, the distance in the track width direction TW between a portion of the first side surface S1 located in the track width defining portion and a portion of the third side surface S3 located in the track width defining portion is generally constant regardless of the distance from the medium facing surface 80.

As shown in FIG. 1 and FIG. 3, the first side shield 16A has the end face 16Aa located in the medium facing surface 80, and has a first sidewall SW1, a second sidewall SW2 and a fifth sidewall SW5. The first sidewall SW1 is opposed to the first side surface S1 of the main pole 15. The second sidewall SW2 is located farther from the medium facing surface 80 than is the first sidewall SW1, and is opposed to the second side surface S2 of the main pole 15. The fifth sidewall SW5 connects the first sidewall SW1 to the second sidewall SW2.

Further, as shown in FIG. 1 and FIG. 3, the second side shield 16B has the end face 16Ba located in the medium facing surface 80, and has a third sidewall SW3, a fourth sidewall SW4 and a sixth sidewall SW6. The third sidewall SW3 is opposed to the third side surface S3 of the main pole 15. The fourth sidewall SW4 is located farther from the medium facing surface 80 than is the third sidewall SW3, and is opposed to the fourth side surface S4 of the main pole 15. The sixth sidewall SW6 connects the third sidewall SW3 to the fourth sidewall SW4.

As shown in FIG. 4 and FIG. 5, the first through fourth sidewalls SW1-SW4 are inclined relative to the direction perpendicular to the top surface 1a of the substrate 1 (see FIG. 6). As shown in FIG. 4, the distance between the first sidewall SW1 and the third sidewall SW3 in the track width direction TW decreases with increasing proximity to the top surface 1a of the substrate 1. As shown in FIG. 5, the distance between the second sidewall SW2 and the fourth sidewall SW4 in the track width direction TW decreases with increasing proximity to the top surface 1a of the substrate 1. Although not illustrated, the fifth and sixth sidewalls SW5 and SW6 are also inclined relative to the direction perpendicular to the top surface 1a of the substrate 1. The distance from the medium facing surface 80 to an arbitrary point on the fifth sidewall SW5 increases with decreasing distance from the arbitrary point to the top surface 1a of the substrate 1. The distance from the medium facing surface 80 to an arbitrary point on the sixth sidewall SW6 increases with decreasing distance from the arbitrary point to the top surface 1a of the substrate 1.

As shown in FIG. 3, the distance between the first sidewall SW1 and the third sidewall SW3 in the track width direction TW increases with increasing distance from the medium facing surface 80. When the main pole 15 includes the track width defining portion mentioned previously, the distance in the track width direction TW between a portion of the first sidewall SW1 opposed to the portion of the first side surface S1 located in the track width defining portion and a portion of the third sidewall SW3 opposed to the portion of the third side surface S3 located in the track width defining portion is generally constant regardless of the distance from the medium facing surface 80. Further, in the example shown in FIG. 3, the distance between the second sidewall SW2 and the fourth sidewall SW4 in the track width direction TW increases with increasing distance from the medium facing surface 80. Alternatively, this distance may be constant regardless of the distance from the medium facing surface 80.

As shown in FIG. 1, FIG. 3 and FIG. 5, the nonmagnetic layer 61 includes a first portion 61A located between the second side surface S2 of the main pole 15 and the second sidewall SW2 of the first side shield 16A, and a second portion 61B located between the fourth side surface S4 of the main pole 15 and the fourth sidewall SW4 of the second side shield 16B. In FIG. 1 and FIG. 3, dotted lines indicate the respective boundaries of the first and second portions 61A and 61B with portions of the nonmagnetic layer 61 other than the first and second portions 61A and 61B. The first portion 61A is in contact with the second edge E2 of the fifth side surface S5. The second portion 61B is in contact with the fourth edge E4 of the sixth side surface S6.

The first gap layer 18 is provided along the first through sixth sidewalls SW1-SW6. The seed layer 60 is present between the first gap layer 18 and the first side surface S1 of the main pole 15 and between the first gap layer 18 and the third side surface S3 of the main pole 15; however, no part of the nonmagnetic layer 61 is present therebetween. The distance between the second side surface S2 of the main pole 15 and the second sidewall SW2 is greater than the distance between the first side surface S1 of the main pole 15 and the first sidewall SW1. The distance between the fourth side surface S4 of the main pole 15 and the fourth sidewall SW4 is greater than the distance between the third side surface S3 of the main pole 15 and the third sidewall SW3. The two portions 61A and 61B have the function of magnetically separating the main pole 15 from the side shields 16A and 16B at locations away from the medium facing surface 80.

The specific functions and effects of the magnetic head according to the present embodiment will now be described. In the present embodiment, the write shield 16 includes the first side shield 16A, the second side shield 16B, the bottom shield 16C and the top shield 16D. The present embodiment makes it possible that, in regions on opposite sides of the end face of the main pole 15 in the track width direction TW and regions on the front and rear sides in the direction T of travel of the recording medium 90 relative to the end face of the main pole 15, a magnetic flux that is produced from the end face of the main pole 15 and spreads in directions other than the direction perpendicular to the plane of the recording medium 90 can be captured and thereby prevented from reaching the recording medium 90. The present embodiment thereby allows for preventing unwanted erasure.

Further, in the present embodiment, the end face of the main pole 15 located in the medium facing surface 80 has the second and third sides A2 and A3 which are opposite in the track width direction TW, and the distance between the second side A2 and the third side A3 in the track width direction TW decreases with increasing proximity to the top surface 1a of the substrate 1. The present embodiment thereby allows for preventing unwanted erasure from being induced by the skew.

Further, in the present embodiment, the main pole 15 has the first through sixth side surfaces S1-S6 defined as above, and the write shield 16 includes the first and second side shields 16A and 16B. Now, a magnetic head having a main pole of the following shape will be contemplated as a comparative example against the present embodiment. The main pole of the magnetic head of this comparative example is such that the distance between the second side surface S2 and the fourth side surface S4 in the track width direction TW decreases with increasing proximity to the top surface 1a of the substrate 1, and the angle formed by each of the second and fourth side surfaces S2 and S4 with respect to the direction perpendicular to the top surface 1a of the substrate 1 is the same as that formed by each of the first and third side surfaces S1 and S3 with respect to the direction perpendicular to the top surface 1a of the substrate 1. The main pole of this comparative example is unable to allow much magnetic flux to pass therethrough, especially through a portion near the boundary between the first side surface S1 and the second side surface S2 and a portion near the boundary between the third side surface S3 and the fourth side surface S4, and this will result in degradation of write characteristics such as overwrite property.

When compared with the comparative example, the main pole 15 of the present embodiment is larger in cross-sectional area perpendicular to the direction of flow of magnetic flux in the portions near the aforementioned boundaries. Thus, when compared with the comparative example, the main pole 15 of the present embodiment allows more magnetic flux to pass through the portion near the fifth side surface S5 or the boundary between the first side surface S1 and the second side surface S2 and a portion near the sixth side surface S6 or the boundary between the third side surface S3 and the fourth side surface S4. Consequently, the present embodiment provides improved write characteristics, such as improved overwrite property, over the comparative example.

As discussed above, the main pole 15 of the present embodiment allows for preventing unwanted erasure and improving write characteristics at the same time.

Further, as previously described, the two portions 61A and 61B of the nonmagnetic layer 61 have the function of magnetically separating the main pole 15 from the side shields 16A and 16B at locations away from the medium facing surface 80. This makes it possible to suppress flux leakage from the second and fourth side surfaces S2 and S4 of the main pole 15 to the side shields 16A and 16B. Consequently, the main pole 15 is able to guide much magnetic flux to the medium facing surface 80, thereby allowing for improvement of write characteristics (overwrite property).

Further, the present embodiment allows the shapes of the first and third side surfaces S1 and S3 of the main pole 15 to be defined by the first sidewall SW1 of the side shield 16A, the third sidewall SW3 of the side shield 16B and the first gap layer 18, and allows the shapes of the second and fourth side surfaces S2 and S4 of the main pole 15 to be defined independently of the second sidewall SW2 of the side shield 16A and the fourth sidewall SW4 of the side shield 16B. In other words, in the present embodiment, it is not necessary that all of the sidewalls of the side shields 16A and 16B be formed into complicated shapes corresponding to the first through sixth side surfaces S1-S6 of the main pole 15, but only the sidewalls SW1 and SW3 need to be formed into shapes corresponding to the side surfaces S1 and S3 of the main pole 15, respectively. As will be described in detail later, the shapes of the side surfaces S2, S4, S5 and S6 of the main pole 15 are easily definable by photolithography. Consequently, the present embodiment provides a magnetic head that achieves prevention of unwanted erasure and improved write characteristics at the same time and has the main pole 15 and the two side shields 16A and 16B whose shapes are easily determinable.

A method of manufacturing the magnetic head according to the present embodiment will now be described. In the method of manufacturing the magnetic head according to the present embodiment, first, as shown in FIG. 6 and FIG. 7, the insulating layer 2, the first read shield layer 3, and the first read shield gap film 4 are formed in this order on the substrate 1. Next, the MR element 5 and leads (not illustrated) connected to the MR element 5 are formed on the first read shield gap film 4. The MR element 5 and the leads are then covered with the second read shield gap film 6. Then, the second read shield layer 7, the nonmagnetic layer 71, the middle shield layer 72, and the nonmagnetic layer 73 are formed in this order on the second read shield gap film 6.

Next, the magnetic layer 31 is formed on the nonmagnetic layer 73 by frame plating, for example. Then, the insulating layer 51 is formed over the entire top surface of the stack. The insulating layer 51 is then polished by, for example, chemical mechanical polishing (hereinafter referred to as CMP), until the magnetic layer 31 is exposed. Next, the magnetic layers 32 and 33 are formed on the magnetic layer 31 by frame plating, for example. The insulating film 52 is then formed over the entire top surface of the stack. Next, the first portion 10 of the coil is formed by frame plating, for example. The insulating layer 53 is then formed in the space between adjacent turns of the first portion 10. Next, the insulating layer 54 is formed over the entire top surface of the stack. The insulating layer 54 is then polished by, for example, CMP, until the first portion 10, the magnetic layers 32 and 33 and the insulating layer 53 are exposed.

Next, the insulating layer 55 is formed over the entire top surface of the stack. The insulating layer 55 is then selectively etched to form therein a first opening for exposing the top surface of the magnetic layer 32, a second opening for exposing the top surface of the magnetic layer 33, and a third opening for exposing the coil connection 10E (see FIG. 8) of the first portion 10. Then, frame plating, for example, is performed so that the magnetic layer 34 is formed on the magnetic layer 32 at the position of the first opening, the magnetic layer 35 is formed on the magnetic layer 33 at the position of the second opening, and the first connection layer, not illustrated, is formed on the coil connection 10E at the position of the third opening. Next, the insulating layer 56 is formed over the entire top surface of the stack. The insulating layer 56 is then polished by, for example, CMP, until the magnetic layers 34 and 35 and the first connection layer are exposed.

Reference is now made to FIG. 11A through FIG. 26B to describe a series of steps to be performed after the foregoing step up to the formation of the top shield 16D and the magnetic layer 41. FIG. 11A through FIG. 26B each show a stack of layers formed in the process of manufacturing the magnetic head. Portions that are closer to the substrate 1 relative to the bottom shield 16C and the nonmagnetic layer 57 are omitted from these figures. The symbol "ABS" shown in some of these figures indicates the position at which the medium facing surface 80 is to be formed. FIGS. 11A-24A each show the top surface of part of the stack. FIGS. 11B-24B each show a cross section of the stack taken at the position at which the medium facing surface 80 is to be formed. FIGS. 11C and 24C each show a cross section perpendicular to the medium facing surface 80 and to the top surface 1a of the substrate 1. FIGS. 18C-23C each show a cross section parallel to the position at which the medium facing surface 80 is to be formed. Line 11C-11C in FIG. 11A indicates the position of the cross section shown in FIG. 11C. In FIGS. 18A-24A, lines nC-nC (n is any integer between 18 and 24 inclusive) indicate the positions of the cross sections shown in FIGS. 18C-24C.

Figure 25A:
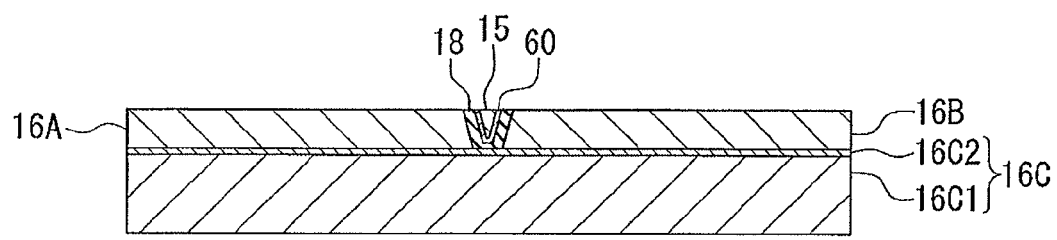
FIG. 25A and FIG. 25B are explanatory diagrams showing a step that follows the step shown in FIG. 24A to FIG. 24C.
Figure 25B:
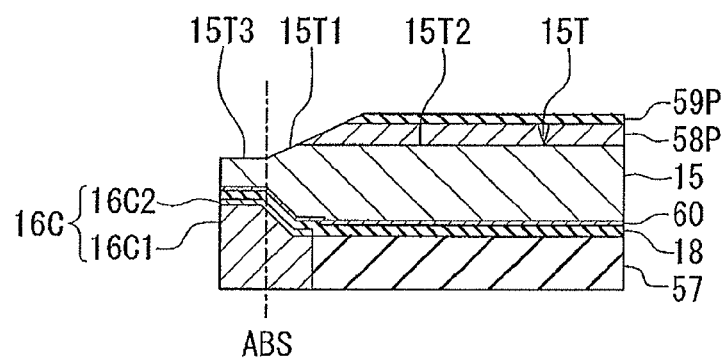
Figure 26A:
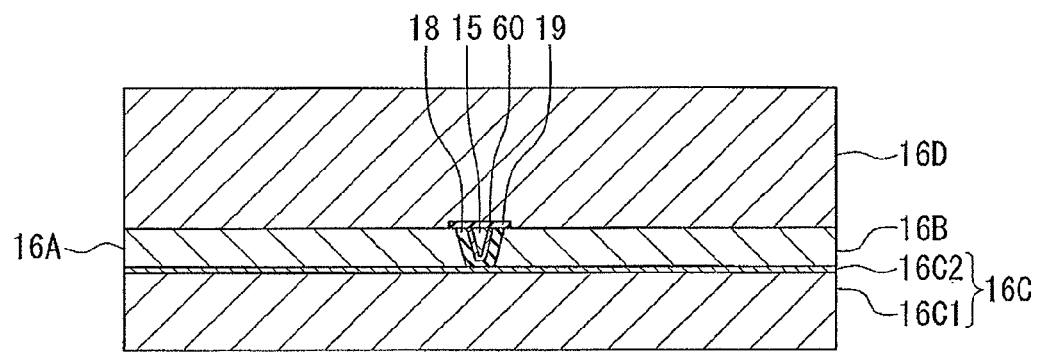
FIG. 26A and FIG. 26B are explanatory diagrams showing a step that follows the step shown in FIG. 25A and FIG. 25B.
Figure 26B:
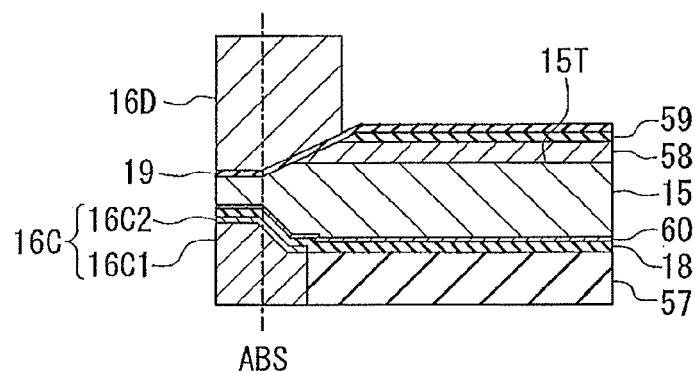

FIGS. 25A and 26A each show a cross section of the stack taken at the position at which the medium facing surface 80 is to be formed. FIGS. 25B and 26B each show a cross section perpendicular to the medium facing surface 80 and to the top surface 1a of the substrate 1.

Figure 11A:
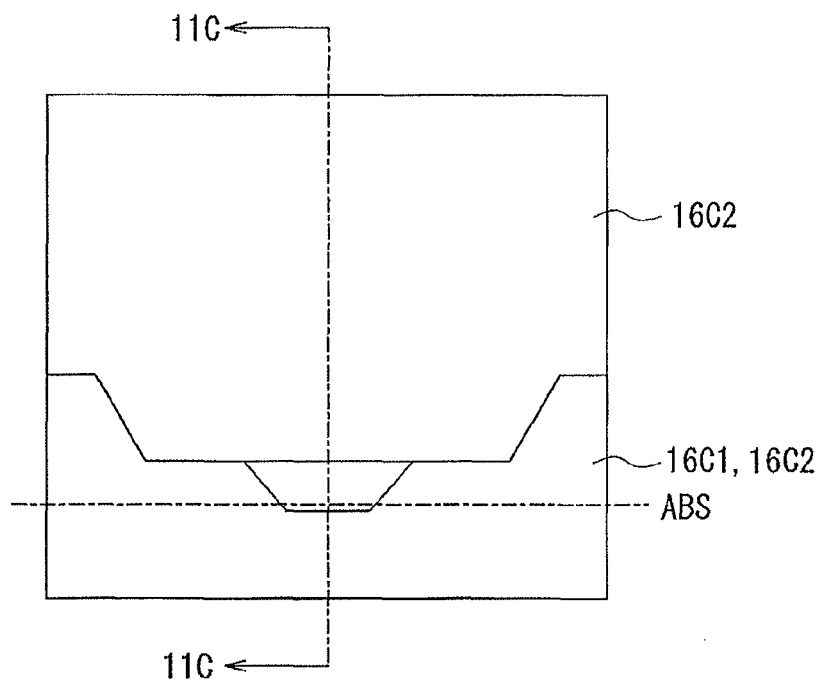
FIG. 11A to FIG. 11C are explanatory diagrams showing a step of a method of manufacturing the magnetic head according to the first embodiment of the invention.
Figure 11B:
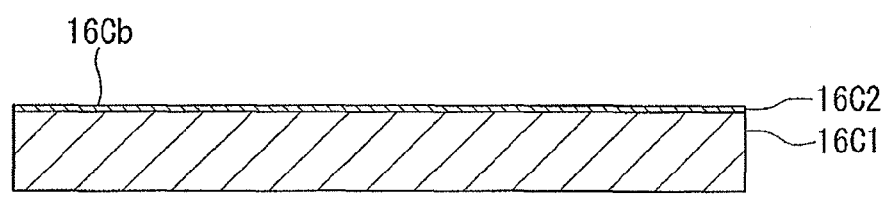
Figure 11C:
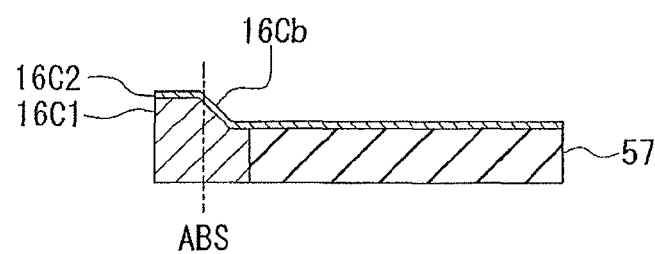

FIG. 11A to FIG. 11C show a step that follows the polishing of the insulating layer 56. In this step, first, a magnetic layer that later becomes the first layer 16C1 of the bottom shield 16C is formed by frame plating, for example. Next, the nonmagnetic layer 57 is formed over the entire top surface of the stack. The nonmagnetic layer 57 is then polished by, for example, CMP, until the magnetic layer is exposed. Then, the magnetic layer and the nonmagnetic layer 57 are taper-etched in part by, for example, ion beam etching, so as to provide the top surface of the magnetic layer with a portion to be opposed to the inclined portion 15L1 of the bottom end 15L of the main pole 15 to be formed later. The magnetic layer thereby becomes the first layer 16C1.

Next, the second layer 16C2 of the bottom shield 16 is formed over the first layer 16C1 and the nonmagnetic layer 57 by sputtering or ion beam deposition, for example. The second layer 16C2 will later serve as a seed layer when plating is performed to form a magnetic layer to become the side shields 16A and 16B on the top surface 16Cb of the bottom shield 16C. The second layer 16C2 except a portion lying on the first layer 16C1 will be removed later by etching. The bottom shield 16C is formed of the first layer 16C1 and the etched second layer 16C2. In the following description, for the sake of convenience, the stack of the first layer 16C1 and the second layer 16C2 will be referred to as the bottom shield 16C even before the second layer 16C2 is etched.

Figure 12A:
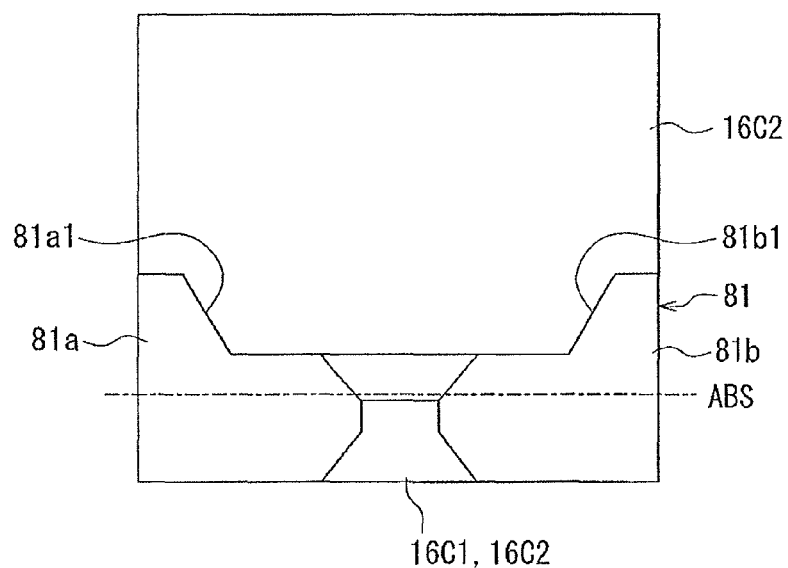
FIG. 12A and FIG. 12B are explanatory diagrams showing a step that follows the step shown in FIG. 11A to FIG. 11C.
Figure 12B:
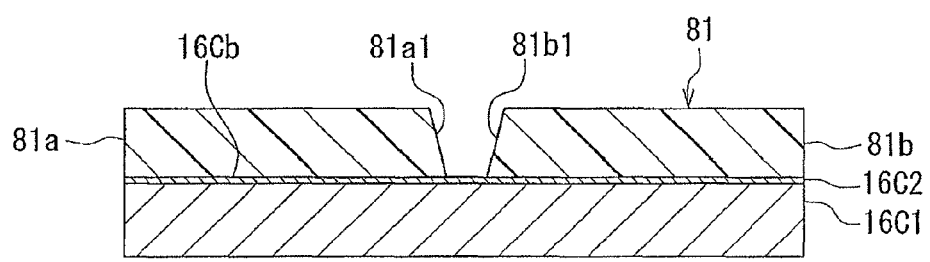

FIG. 12A and FIG. 12B show the next step. In this step, a photoresist layer of a positive photoresist is patterned by photolithography to form a first resist layer 81 on a region of the top surface 16Cb of the bottom shield 16C (the top surface of the second layer 16C2) where the side shields 16A and 16B are to be formed later. The first resist layer 81 includes a portion 81a shaped to correspond to the shape of the first side shield 16A to be formed later, and a portion 81b shaped to correspond to the shape of the second side shield 16B to be formed later. More specifically, in this step, first, the photoresist layer of a positive photoresist is formed over the entire top surface of the stack. The photoresist layer is formed such that its top surface is higher in level than the top surfaces of the first and second side shields 16A and 16B to be formed later. Next, the photoresist layer is selectively exposed to light using a photomask. The photomask has a light-transmitting part which allows the light for exposure to pass therethrough, and a light-blocking part which blocks the light for exposure. The light-blocking part of the photomask includes portions that are shaped to correspond to the planar shape of the first and second side shields 16A and 16B to be formed later. Next, the exposed photoresist layer is developed. As a result of the exposure, the area of the photoresist layer irradiated with the light having passed through the light-transmitting part of the photomask becomes soluble in a developing solution, while the other area remains insoluble in the developing solution. The photoresist layer remaining after the development makes the first resist layer 81.

The portion 81a of the first resist layer 81 has a wall face 81a1 that includes portions corresponding to the sidewalls SW1, SW2 and SW5 of the first side shield 16A to be formed later. The portion 81b of the first resist layer 81 has a wall face 81b1 that includes portions corresponding to the sidewalls SW3, SW4 and SW6 of the second side shield 16B to be formed later. In this step, the photoresist layer is patterned so that both the wall faces 81a1 and 81b1 become inclined relative to the direction perpendicular to the top surface 1a of the substrate 1 and that the distance between the portion of the wall face 81a1 corresponding to the sidewall SW1 and the portion of the wall face 81b1 corresponding to the sidewall SW3 decreases with increasing proximity to the top surface 1a (see FIG. 6) of the substrate 1. Such patterning can be accomplished by using a photoresist layer that consists of a lower layer of low sensitivity and an upper layer of high sensitivity. It should be noted that the distance between the portion of the wall face 81a1 corresponding to the sidewall SW2 and the portion of the wall face 81b1 corresponding to the sidewall SW4 also decreases with increasing proximity to the top surface 1a of the substrate 1. Further, the distance between the position ABS at which the medium facing surface 80 is to be formed and an arbitrary point on the portion of the wall face 81a1 corresponding to the sidewall SW5 increases with decreasing distance between the arbitrary point and the top surface 1a of the substrate 1. The distance between the position ABS and an arbitrary point on the portion of the wall face 81b1 corresponding to the sidewall SW6 increases with decreasing distance between the arbitrary point and the top surface 1a of the substrate 1.

Figure 13A:
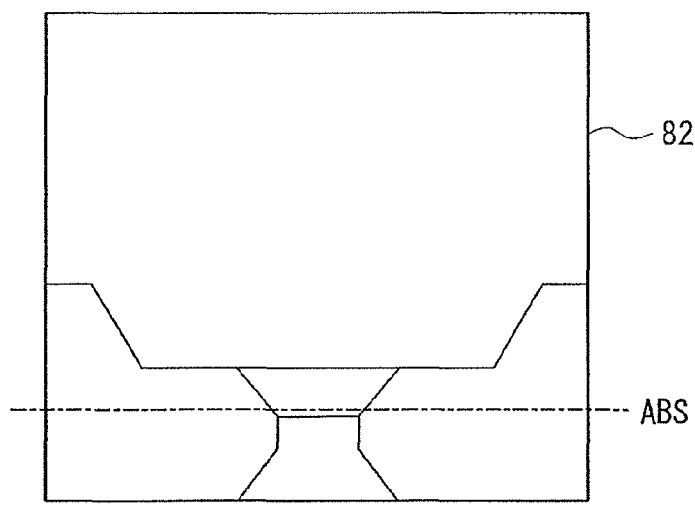
FIG. 13A and FIG. 13B are explanatory diagrams showing a step that follows the step shown in FIG. 12A and FIG. 12B.
Figure 13B:
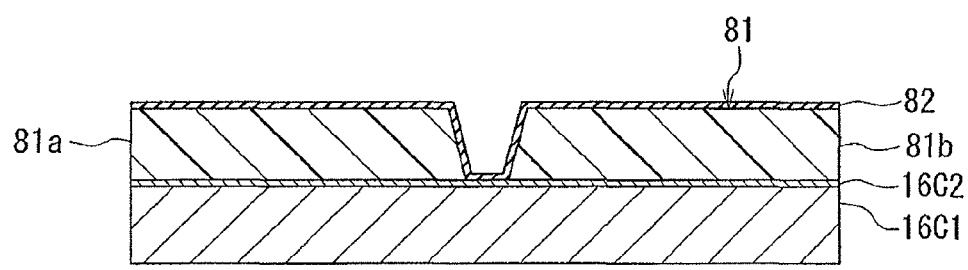

FIG. 13A and FIG. 13B show the next step. In this step, a separating film 82 of a nonmagnetic material is formed to cover the first resist layer 81. The separating film 82 is provided to prevent the first resist layer 81 of a positive photoresist from being mixed with a photoresist layer of a negative photoresist that will be formed later. The separating film 82 has a thickness in the range of 5 to 20 nm, for example. The separating film 82 may be formed of alumina or a synthetic resin, for example. Where alumina is selected as the material for the separating film 82, the separating film 82 is formed by ion beam deposition, for example.

Figure 14A:
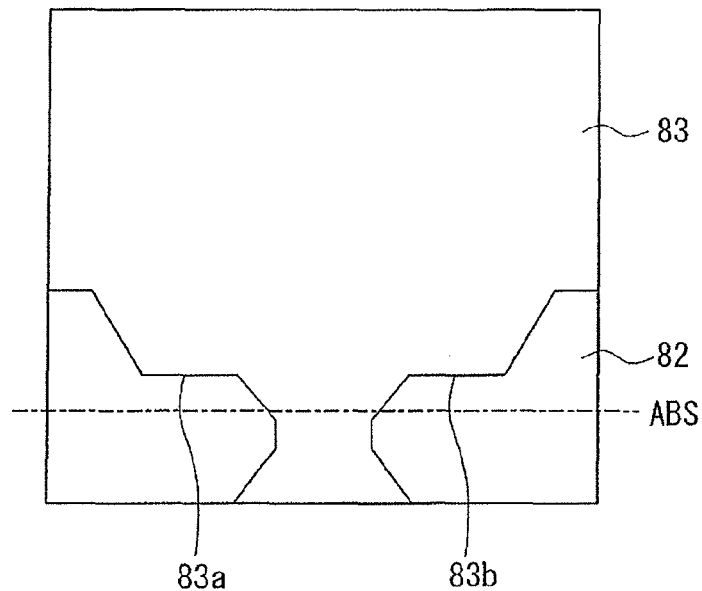
FIG. 14A and FIG. 14B are explanatory diagrams showing a step that follows the step shown in FIG. 13A and FIG. 13B.
Figure 14B:
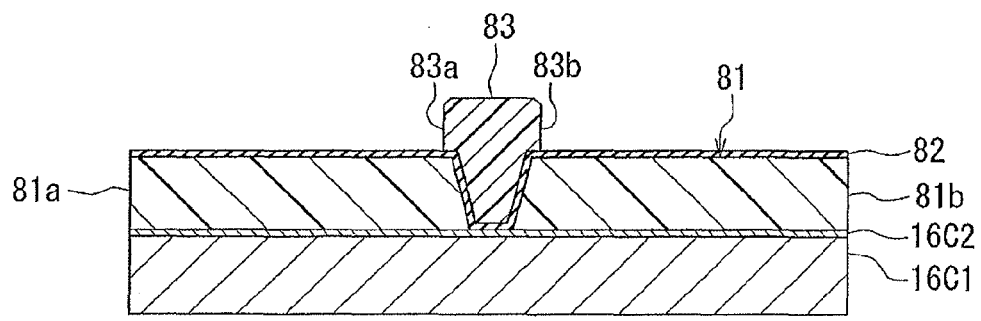

FIG. 14A and FIG. 14B show the next step. In this step, a photoresist layer of a negative photoresist is patterned by photolithography to form a second resist layer 83 on the separating film 82. The second resist layer 83 has an opening 83a shaped to correspond to the shape of the first side shield 16A to be formed later, and an opening 83b shaped to correspond to the shape of the second side shield 16B to be formed later. More specifically, in this step, first, the photoresist layer of a negative photoresist is formed over the entire top surface of the stack. The photoresist layer is formed such that its top surface is higher in level than the top surface of a portion of the separating film 82 that lies on the first resist layer 81. Next, the photoresist layer is selectively exposed to light using a photomask. The photomask has a light-transmitting part which allows the light for exposure to pass therethrough, and a light-blocking part which blocks the light for exposure, as does the photomask used when forming the first resist layer 81. The light-blocking part of the photomask includes portions shaped to correspond to the planar shape of the first and second side shields 16A and 16B to be formed later. Next, the exposed photoresist layer is developed. As a result of the exposure, the area of the photoresist layer irradiated with the light having passed through the light-transmitting part of the photomask becomes insoluble in the developing solution, while the other area remains soluble in the developing solution. The photoresist layer remaining after the development makes the second resist layer 83.

Figure 15A:
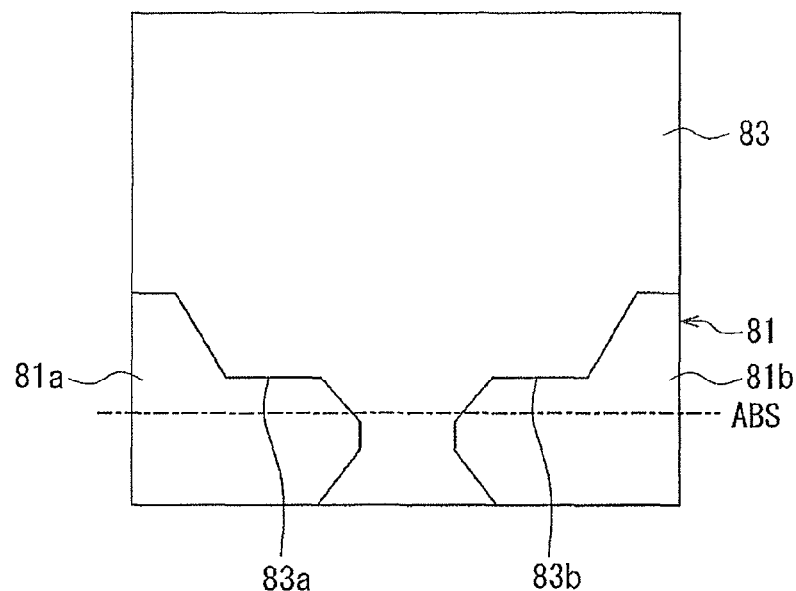
FIG. 15A and FIG. 15B are explanatory diagrams showing a step that follows the step shown in FIG. 14A and FIG. 14B.
Figure 15B:
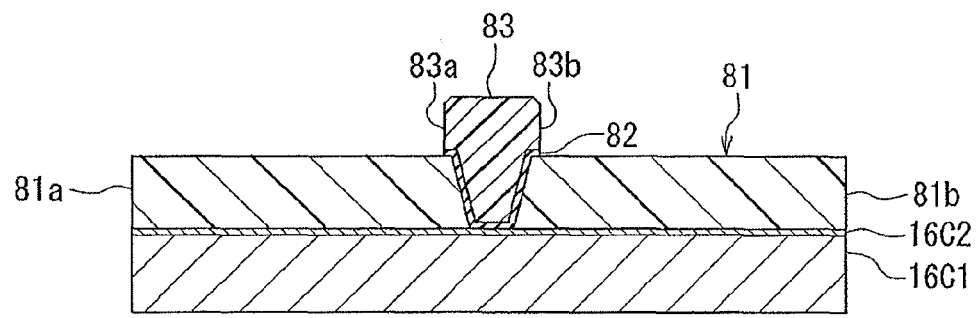

FIG. 15A and FIG. 15B show the next step. In this step, portions of the separating film 82 that are not covered with the second resist layer 83 are removed by wet etching, for example.

Figure 16A:
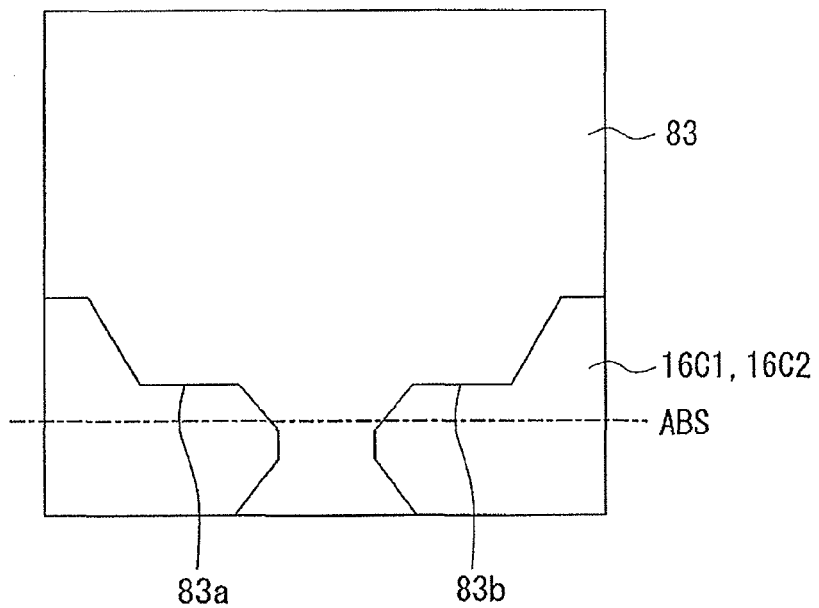
FIG. 16A and FIG. 16B are explanatory diagrams showing a step that follows the step shown in FIG. 15A and FIG. 15B.
Figure 16B:
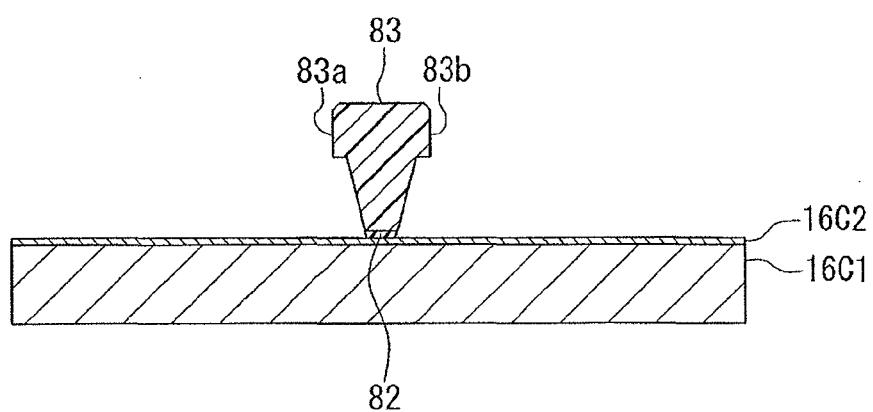

FIG. 16A and FIG. 16B show the next step. In this step, the first and second resist layers 81 and 83 are exposed to light and then the first resist layer 81 is removed from the openings 83a and 83b of the second resist layer 83. More specifically, first, the entire top surface of the stack is exposed to light. The exposure causes the first resist layer 81 of a positive photoresist to become soluble in a developing solution, and allows the second resist layer 83 of a negative photoresist to remain insoluble in the developing solution. Next, the first resist layer 81 is removed using an alkaline developing solution, for example. In this step, portions of the separating film 82 extending along the wall faces of the openings 83a and 83b of the second resist layer 83 are also removed when or after the first resist layer 81 is removed. In this step, a portion of the separating film 82 lying under a narrow portion of the second resist layer 83 may also be removed. Even in such a case, the second resist layer 83 will not peel away since a portion of the separating film 82 lying under a thick portion of the second resist layer 83 remains.

Figure 17A:
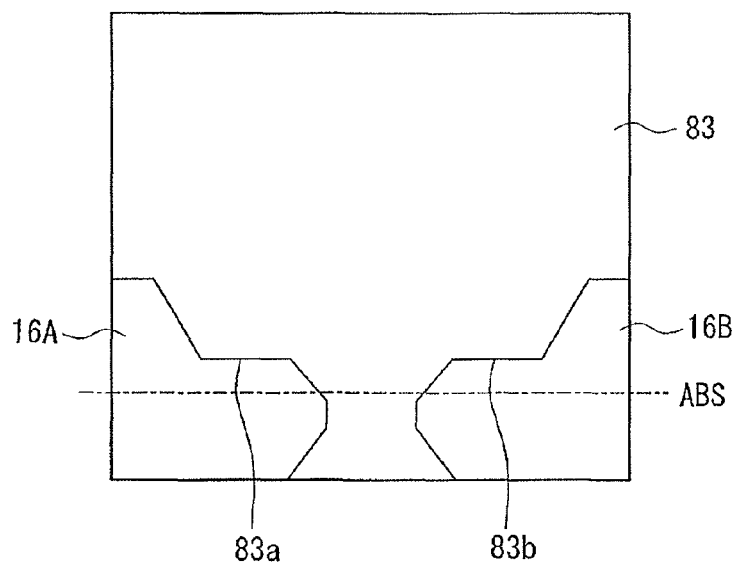
FIG. 17A and FIG. 17B are explanatory diagrams showing a step that follows the step shown in FIG. 16A and FIG. 16B.
Figure 17B:
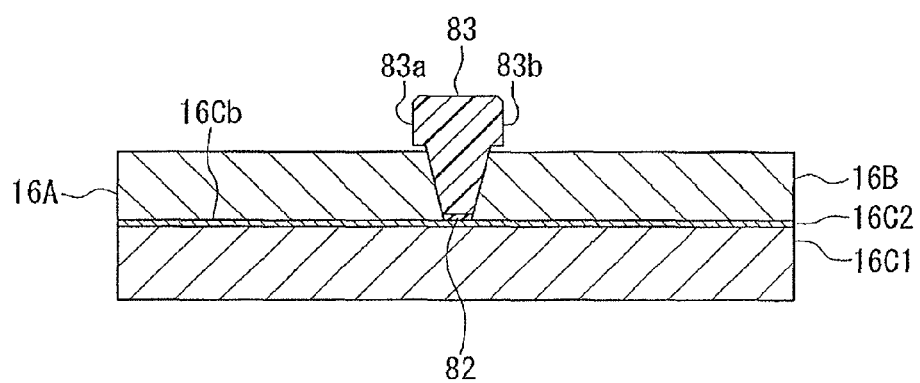
Figure 18A:
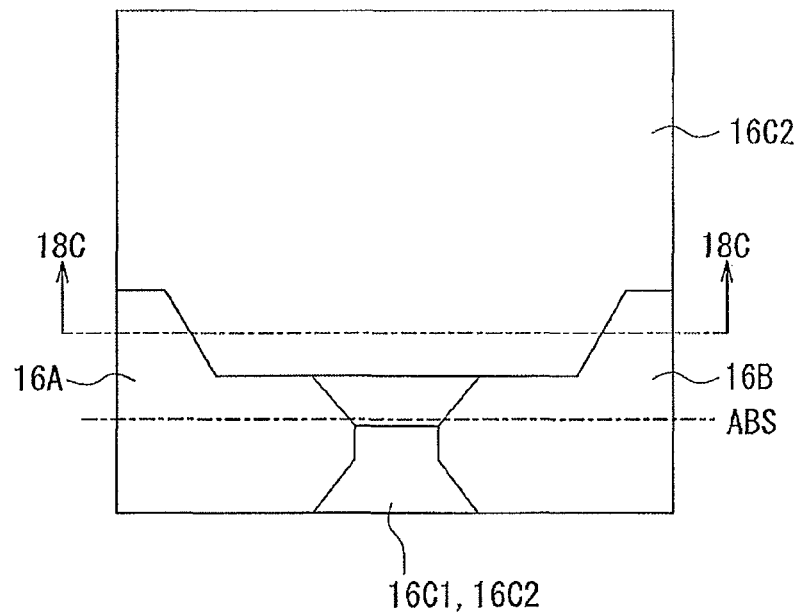
FIG. 18A to FIG. 18C are explanatory diagrams showing a step that follows the step shown in FIG. 17A and FIG. 17B.
Figure 18B:
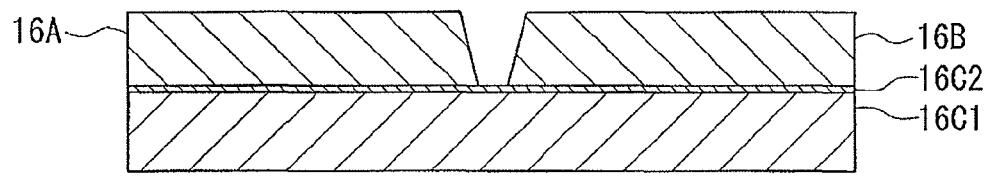
Figure 18C:
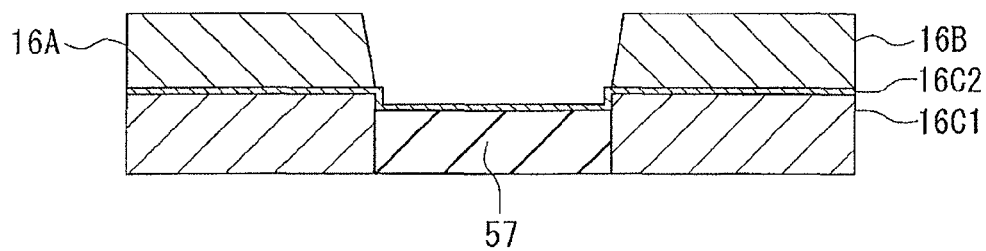

FIG. 17A and FIG. 17B show the next step. In this step, after the removal of the first resist layer 81, the first side shield 16A and the second side shield 16B are formed on the top surface 16Cb of the bottom shield 16C (the top surface of the second layer 16C2) by performing plating without forming a seed layer. The second layer 16C2 of the bottom shield 16C is used as a seed layer and an electrode when forming the side shields 16A and 16B. The side shields 16A and 16B are formed in the openings 83a and 83b of the second resist layer 83, respectively. Next, as shown in FIG. 18A to FIG. 18C, the second resist layer 83 and the separating film 82 are removed.

Figure 19A:
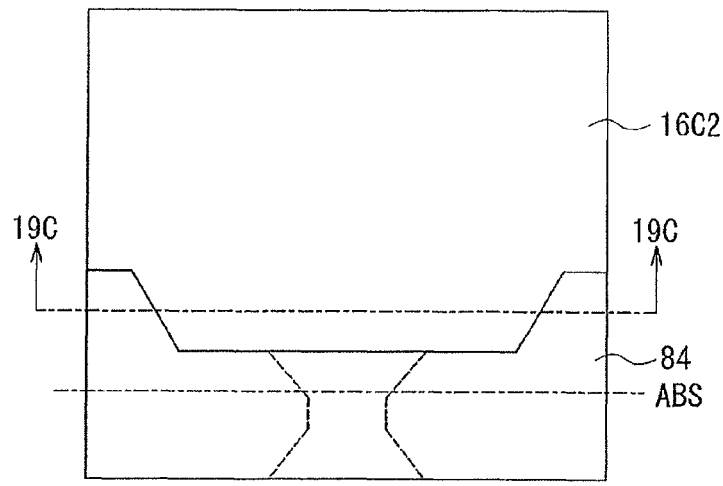
FIG. 19A to FIG. 19C are explanatory diagrams showing a step that follows the step shown in FIG. 18A to FIG. 18C.
Figure 19B:
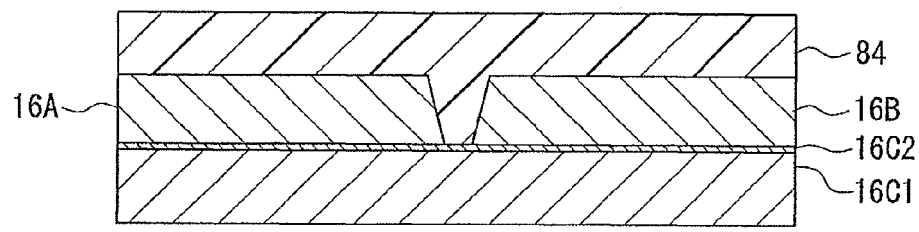
Figure 19C:
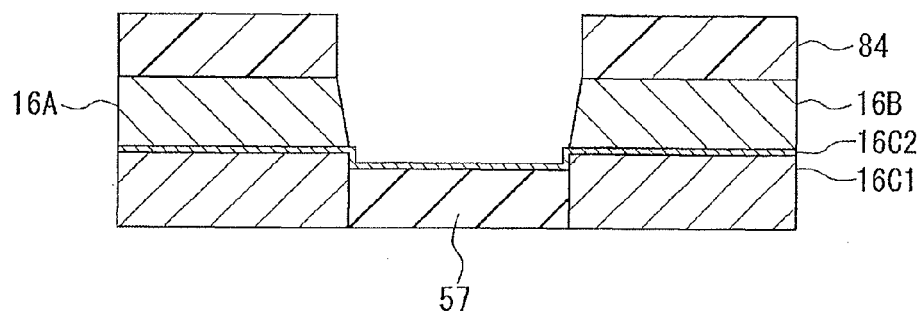

FIG. 19A to FIG. 19C show the next step. In this step, a mask 84 is formed over the bottom shield 16C and the side shields 16A and 16B. The mask 84 is formed by patterning a photoresist layer. The mask 84 does not cover a portion of the second layer 16C2 of the bottom shield 16C other than a portion lying on the first layer 16C1.

Figure 20A:
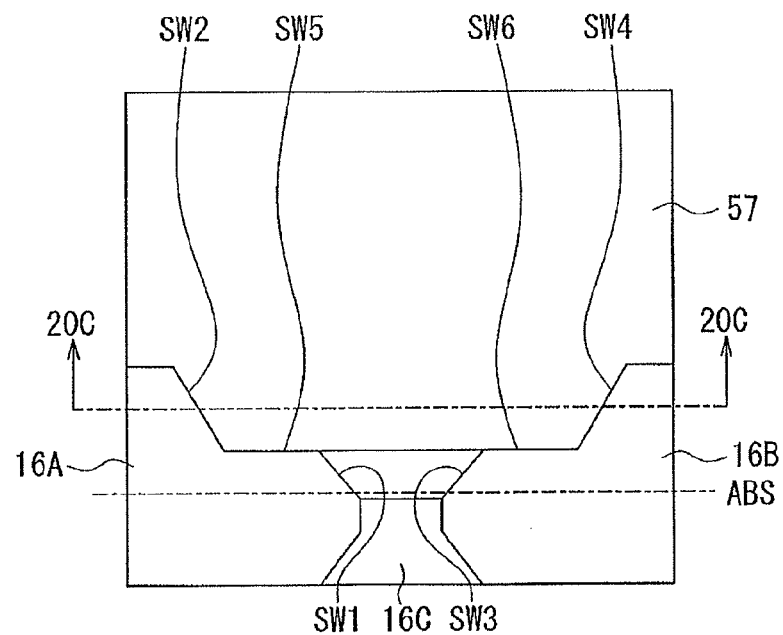
FIG. 20A to FIG. 20C are explanatory diagrams showing a step that follows the step shown in FIG. 19A to FIG. 19C.
Figure 20B:
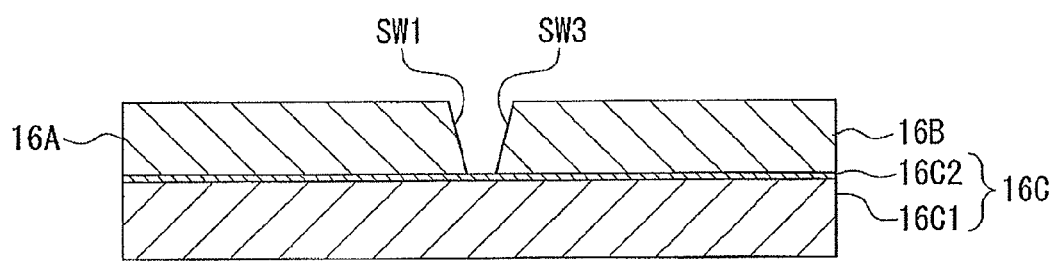
Figure 20C:
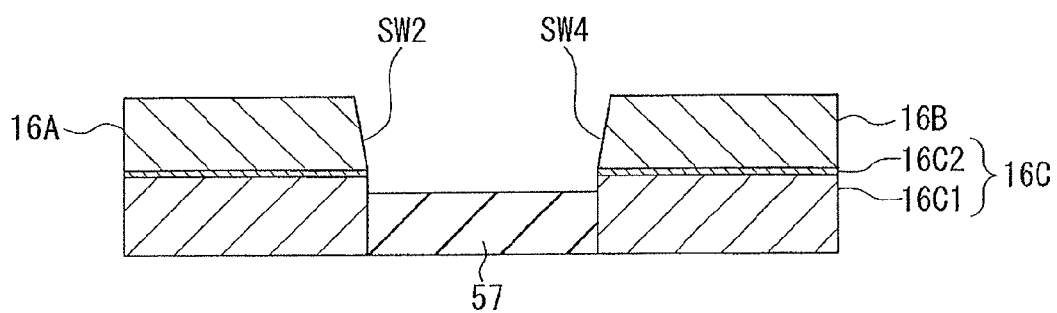

FIG. 20A to FIG. 20C show the next step. In this step, using the mask 84 as an etching mask, the portion of the second layer 16C2 other than the portion lying on the first layer 16C1 is removed by etching. The bottom shield 16C composed of the first layer 16C1 and the second layer 16C2 formed thereon is completed by this etching. The mask 84 is then removed.

Figure 21A:
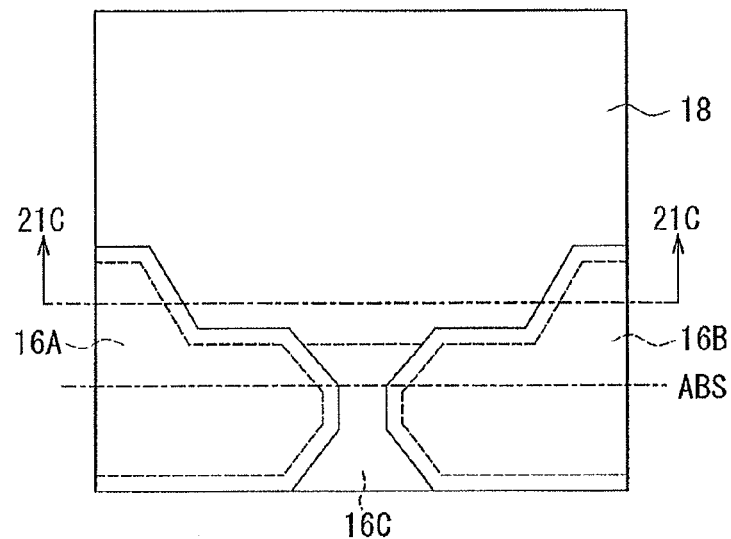
FIG. 21A to FIG. 21C are explanatory diagrams showing a step that follows the step shown in FIG. 20A to FIG. 20C.
Figure 21B:
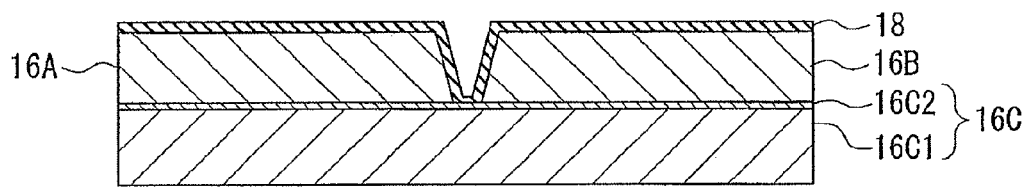
Figure 21C:
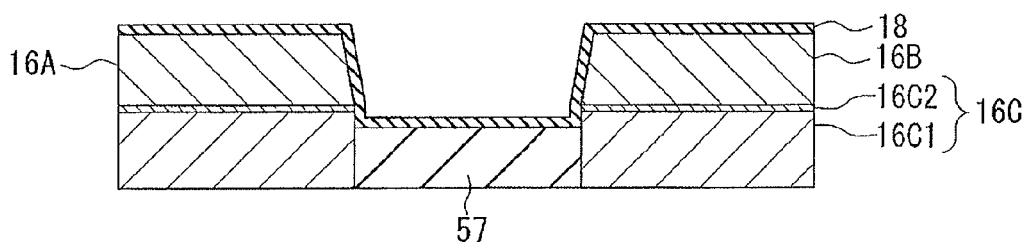

FIG. 21A to FIG. 21C show the next step. In this step, the first gap layer 18 is formed over the entire top surface of the stack. Where alumina is selected as the material of the first gap layer 18, the first gap layer 18 is formed by atomic layer deposition (ALD), for example. Where Ru is selected as the material of the first gap layer 18, the first gap layer 18 is formed by chemical vapor deposition (CVD), for example.

Figure 22A:
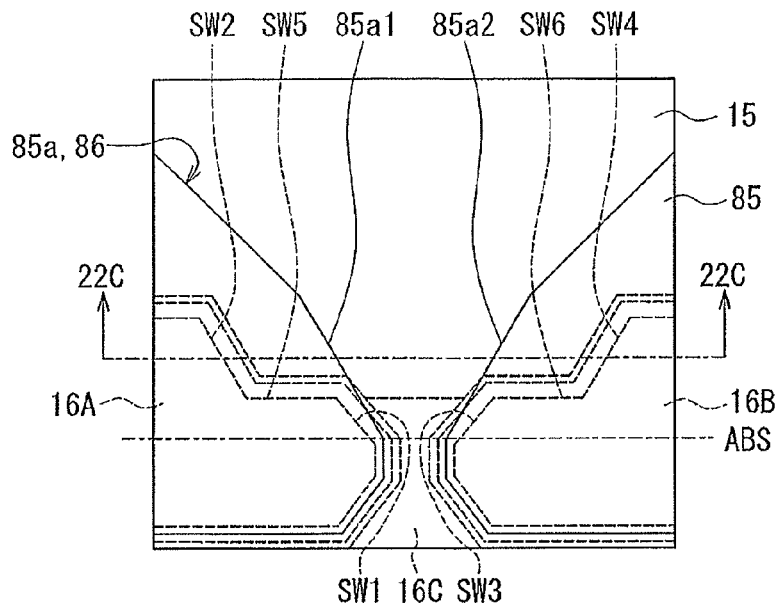
FIG. 22A to FIG. 22C are explanatory diagrams showing a step that follows the step shown in FIG. 21A to FIG. 21C.
Figure 22B:
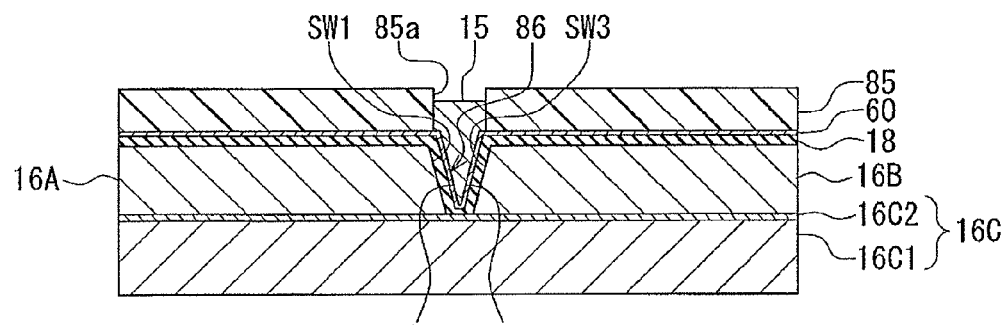
Figure 22C:
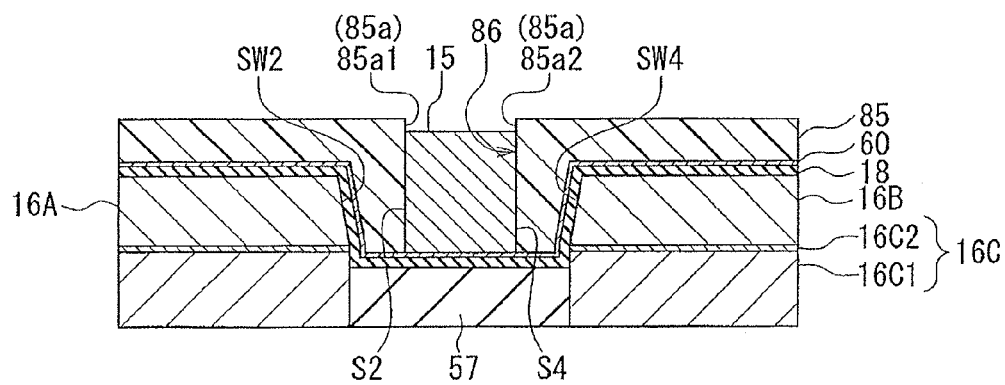
Figure 23A:
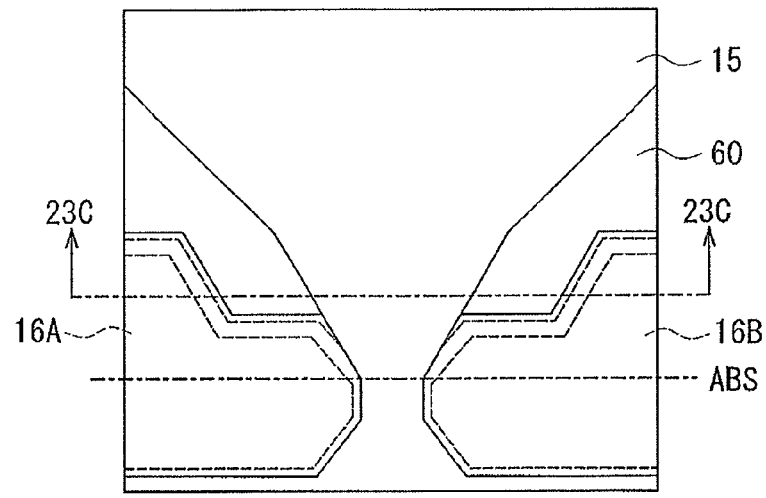
FIG. 23A to FIG. 23C are explanatory diagrams showing a step that follows the step shown in FIG. 22A to FIG. 22C.
Figure 23B:
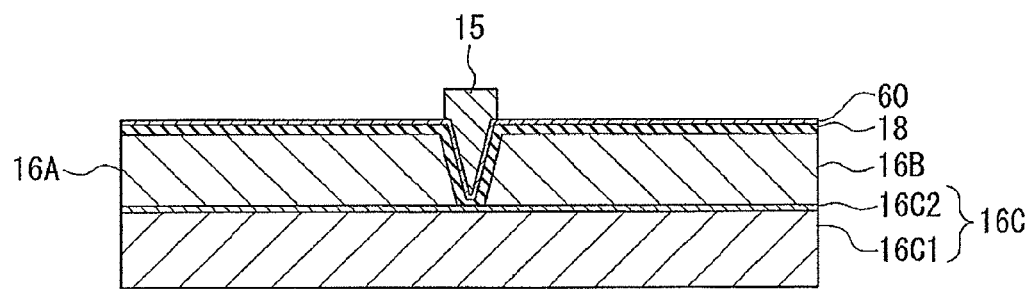
Figure 23C:
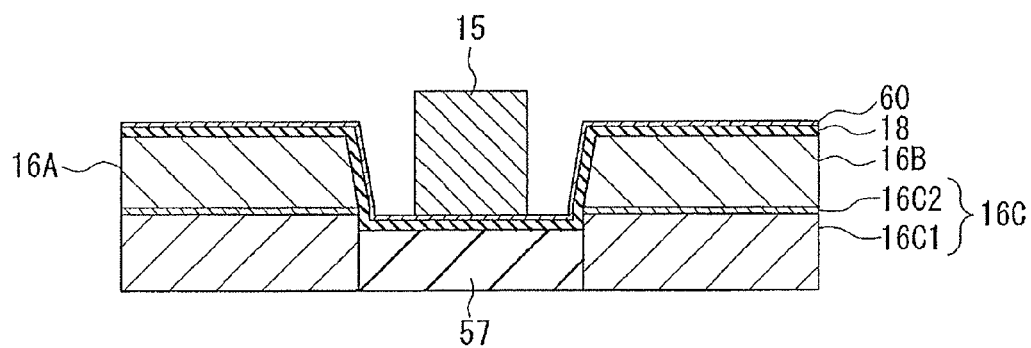

FIG. 22A to FIG. 22C show the next step. In this step, first, the seed layer 60 is formed over the entire top surface of the stack by sputtering or ion beam deposition, for example. The first gap layer 18 and the seed layer 60 are then selectively etched to form therein openings for exposing the top surface of the magnetic layer 36 and openings for exposing the top surface of the non-illustrated second connection layer. Next, a photoresist layer is formed over the entire top surface of the stack. The photoresist layer is then patterned by photolithography to form a mold 85. The mold 85 is formed such that its top surface is higher in level than the top surfaces of portions of the seed layer 60 lying on the side shields 16A and 16B.

The mold 85 has an opening 85a for receiving the main pole 15 and an opening for receiving the non-illustrated third connection layer. The first side shield 16A, the second side shield 16B, the first gap layer 18, and the mold 85 (the opening 85a) form a receiving portion 86 for receiving the main pole 15.

The opening 85a of the mold 85 has a first inner wall 85a1 defining the shape of the second side surface S2 of the main pole 15 and a second inner wall 85a2 defining the shape of the fourth side surface S4 of the main pole 15. When viewed from above, the first inner wall 85a1 intersects a portion of the seed layer 60 located near the boundary between a portion of the seed layer 60 extending along the first sidewall SW1 of the first side shield 16A and a portion of the seed layer 60 extending along the fifth sidewall SW5 of the first side shield 16A. When viewed from above, the second inner wall 85a2 intersects a portion of the seed layer 60 located near the boundary between a portion of the seed layer 60 extending along the third sidewall SW3 of the second side shield 16B and a portion of the seed layer 60 extending along the sixth sidewall SW6 of the second side shield 16B. Further, when viewed from above, the first and second inner walls 85a1 and 85a2 are located outwardly from the positions at which the first and third side surfaces S1 and S3 of the main pole 15 are to be formed.

Next, using the seed layer 60 as an electrode and a seed layer, plating is performed to form the main pole 15 to be received in the receiving portion 86. As shown in FIG. 22B, the shape of the first side surface S1 of the main pole 15 is defined by the first sidewall SW1 of the first side shield 16A and a portion of the first gap layer 18 extending along the first sidewall SW1. The shape of the third side surface S3 of the main pole 15 is defined by the third sidewall SW3 of the second side shield 16B and a portion of the first gap layer 18 extending along the third sidewall SW3. Further, as shown in FIG. 22C, the shape of the second side surface S2 of the main pole 15 is defined by the first inner wall 85a1 of the mold 85. The shape of the fourth side surface S4 of the main pole 15 is defined by the second inner wall 85a2 of the mold 85.

Further, the third connection layer is formed on the second connection layer by plating, for example. The main pole 15 and the third connection layer are formed such that their top surfaces are higher in level than the top surfaces of the portions of the seed layer 60 lying on the side shields 16A and 16B. Then, the mold 85 is removed as shown in FIG. 23A to FIG. 23C.

Figure 24A:
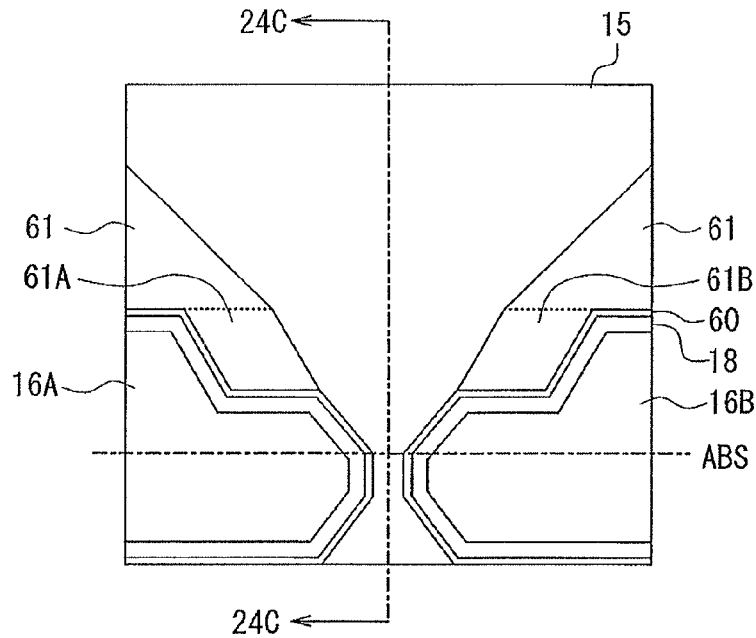
FIG. 24A to FIG. 24C are explanatory diagrams showing a step that follows the step shown in FIG. 23A to FIG. 23C.
Figure 24B:
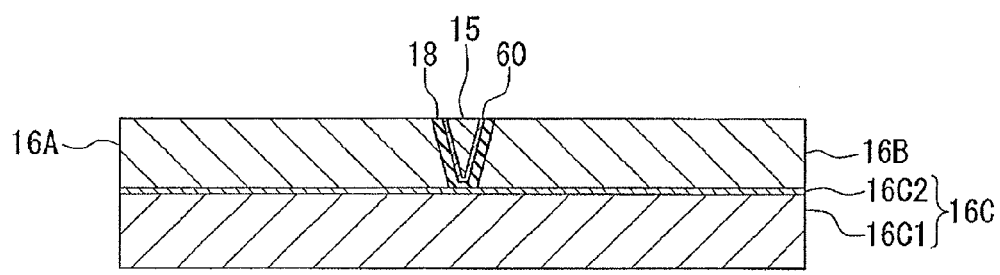
Figure 24C:
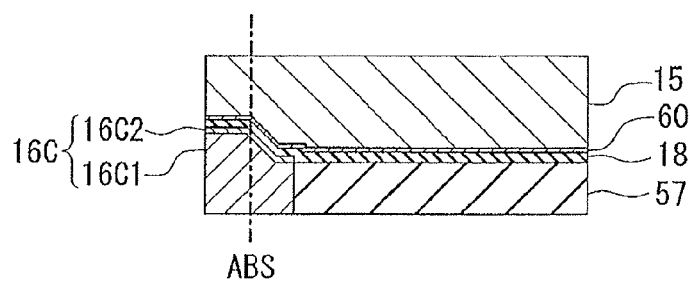

FIG. 24A to FIG. 24C show the next step. In this step, the nonmagnetic layer 61 is formed. The nonmagnetic layer 61 may be formed in the following manner, for example. First, the nonmagnetic layer 61 unpolished is formed from a nonmagnetic material to cover the side shields 16A and 16B, the first gap layer 18 and the main pole 15. The nonmagnetic layer 61 unpolished has a thickness of 0.3 to 0.5 µm, for example. The whole of the nonmagnetic layer 61 unpolished may be formed by atomic layer deposition, for example. Alternatively, the nonmagnetic layer 61 unpolished may be composed of first and second layers. In such a case, the first layer may be formed first by atomic layer deposition and then the second layer may be formed by sputtering. The nonmagnetic layer 61 unpolished has a projecting portion lying above the side shields 16A and 16B and the main pole 15, and peripheral portions lying on the peripheries of the side shields 16A and 16B and being lower in level than the projecting portion.

On the nonmagnetic layer 61 unpolished, a polishing stopper layer of a nonmagnetic metal material is formed by sputtering, for example. The level of the top surfaces of portions of the polishing stopper layer lying over the peripheral portions of the top surface of the nonmagnetic layer 61 defines the level of the flat portion 15T2 of the top surface 15T of the main pole 15 to be formed later. As one example, the polishing stopper layer may be formed of Ru. Next, a layer to be polished is formed by sputtering, for example. The layer to be polished will be polished later, and may be formed of alumina, for example. Next, the layer to be polished, the polishing stopper layer and the nonmagnetic layer 61 are polished by, for example, CMP, until the portions of the polishing stopper layer lying over the peripheral portions of the top surface of the nonmagnetic layer 61 are exposed. In this polishing step, the portions of the polishing stopper layer lying over the peripheral portions of the top surface of the nonmagnetic layer 61 function as a polishing stopper for stopping the polishing. This polishing step makes the top surfaces of the main pole 15, the side shields 16A and 16B, the nonmagnetic layer 61, the third connection layer and the polishing stopper layer even with each other. As shown in FIG. 24A, the nonmagnetic layer 61 after the polishing has the two portions 61A and 61B.

FIG. 25A and FIG. 25B show the next step. In this step, first, a stack of mask layers 58P and 59P is formed over the main pole 15 and the side shields 16A and 16B. The mask layer 58P will later become the nonmagnetic metal layer 58. The mask layer 59P will later become the insulating layer 59. The mask layers 58P and 59P may be formed by, for example, forming a layered film by sputtering and then patterning the layered film by etching. The mask layers 58P and 59P cover a portion that will later become the flat portion 15T2 of the top surface 15T of the main pole 15. An edge of the mask layer 58P that is closer to the position ABS at which the medium facing surface 80 is to be formed defines the position of the boundary between the inclined portion 15T1 and the flat portion 15T2 of the top surface 15T of the main pole 15. Next, the main pole 15, the side shields 16A and 16B and the nonmagnetic layer 61 are etched in part by, for example, ion beam etching, using the mask layers 58P and 59P.

Where ion beam etching is employed to etch the main pole 15, the side shields 16A and 16B and the nonmagnetic layer 61 in part, the ion beam etching is performed in such a manner that the ion beam travels in a direction at an angle of 40° to 75° with respect to the direction perpendicular to the top surface 1a of the substrate 1 and that the direction of travel of the ion beam rotates when viewed in the direction perpendicular to the top surface 1a of the substrate 1. By performing such ion beam etching, the top surface 15T of the main pole 15 is provided with the inclined portion 15T1, the flat portion 15T2 and the second flat portion 15T3. The flat portion 15T2 is covered with the mask layers 58P and 59P, and extends in a direction substantially perpendicular to the medium facing surface 80 to be formed later. Neither of the inclined portion 15T1 and the second flat portion 15T3 is covered with the mask layers 58P and 59P. The second flat portion 15T3 is located closer to the substrate 1 than is the flat portion 15T2, and extends in a direction substantially perpendicular to the medium facing surface 80 to be formed later. The inclined portion 15T1 connects the flat portion 15T2 to the second flat portion 15T3. The inclined portion 15T1 is at an angle of, for example, 12° to 45°, with respect to the direction perpendicular to the medium facing surface 80 to be formed later.

FIG. 26A and FIG. 26B show the next step. In this step, first, the second gap layer 19 is formed over the entire top surface of the stack by sputtering or chemical vapor deposition, for example. Then, the second gap layer 19 and the mask layers 58P and 59P are selectively etched by, for example, ion beam etching, so that a part of the top surface 15T of the main pole 15, a part of each of the top surfaces of the side shields 16A and 16B, and the top surface of the third connection layer are exposed. This makes the mask layers 58P and 59P into the nonmagnetic metal layer 58 and the insulating layer 59, respectively. Then, the top shield 16D is formed over the side shields 16A and 16B and the second gap layer 19, and the magnetic layer 41 is formed on the main pole 15 by, for example, frame plating.

Now, steps to follow the formation of the top shield 16D and the magnetic layer 41 will be described with reference to FIG. 6 and FIG. 7. First, the insulating film 62 is formed over the entire top surface of the stack. The insulating film 62 is then selectively etched to form therein an opening for exposing the top surface of the non-illustrated third connection layer. Next, the first layer 21 of the second portion 20 of the coil is formed by frame plating, for example. Then, the first nonmagnetic layer, not illustrated, is formed over the entire top surface of the stack. The first nonmagnetic layer is then polished by, for example, CMP, until the first layer 21, the top shield 16D and the magnetic layer 41 are exposed.

Next, the insulating layer 63 is formed over the entire top surface of the stack. The insulating layer 63 is then selectively etched to form therein a first opening for exposing the top surface of the top shield 16D and a second opening for exposing the top surface of the magnetic layer 41. Then, frame plating, for example, is performed so that the magnetic layer 42 is formed on the top shield 16D at the position of the first opening and the magnetic layer 43 is formed on the magnetic layer 41 at the position of the second opening.

Next, the insulating film 64 is formed over the entire top surface of the stack. The insulating layer 63 and the insulating film 64 are then selectively etched to form therein openings for exposing the coil connection 21E (see FIG. 9) of the first layer 21. Next, the second layer 22 of the second portion 20 of the coil is formed by frame plating, for example. Then, the second nonmagnetic layer, not illustrated, is formed over the entire top surface of the stack. The second nonmagnetic layer is then polished by, for example, CMP, until the second layer 22 and the magnetic layers 42 and 43 are exposed.

Next, the insulating layer 65 is formed over the entire top surface of the stack. The insulating layer 65 is then selectively etched to form therein an opening for exposing the top surface of the magnetic layer 42 and an opening for exposing the top surface of the magnetic layer 43. Next, the magnetic layer 44 is formed by frame plating, for example. The top shield 16D and the magnetic layers 42 and 44 are then etched by, for example, reactive ion etching or ion beam etching so as to provide the top shield 16D with the connecting surface and provide the magnetic layers 42 and 44 with the respective end faces. Next, the insulating layer 66 is formed over the entire top surface of the stack. The insulating layer 66 is then polished by, for example, CMP, until the magnetic layer 44 is exposed.

Next, the protective layer 70 is formed to cover the entire top surface of the stack. Wiring, terminals and other components are then formed on the protective layer 70, the substrate is cut into sliders, and processing including polishing of the medium facing surface 80 and fabrication of flying rails is performed to complete the magnetic head.

As has been described, the method of manufacturing the magnetic head according to the present embodiment includes the steps of; forming the first and second side shields 16A and 16B; forming the first gap layer 18 after the first and second side shields 16A and 16B are formed; forming the mold 85 by photolithography after the first gap layer 18 is formed, the mold 85 having the first inner wall 85a1 defining the shape of the second side surface S2 of the main pole 15 and the second inner wall 85a2 defining the shape of the fourth side surface S4 of the main pole 15; forming the main pole 15 after the mold 85 is formed; removing the mold 85 after the main pole 15 is formed; forming the nonmagnetic layer 61 after the mold 85 is removed; and forming the coil.

The method of manufacturing the magnetic head according to the present embodiment further includes the steps of: forming the bottom shield 16C before the first and second side shields 16A and 16B are formed; forming the second gap layer 19 after the main pole 15 is formed; and forming the top shield 16D after the second gap layer 19 is formed.

In the method of manufacturing the magnetic head according to the present embodiment, the receiving portion 86 for receiving the main pole 15 is formed by the first side shield 16A, the second side shield 16B, the first gap layer 18 and the mold 85 in the step of forming the mold 85. Then, in the step of forming the main pole 15, the main pole 15 is formed in the receiving portion 86. The shapes of the first and third side surfaces S1 and S3 of the main pole 15 are defined by the first sidewall SW1 of the first side shield 16A, the third sidewall SW3 of the second side shield 16B and the first gap layer 18. The shapes of the second side surface S2 and the fourth side surface S4 of the main pole are defined by the first inner wall 85a1 and the second inner wall 85a2 of the mold 85, respectively.

In the present embodiment, as mentioned previously, it is not necessary that all of the sidewalls of the side shields 16A and 16B be formed into complicated shapes corresponding to the first through sixth side surfaces S1-S6 of the main pole 15, but only the sidewalls SW1 and SW3 need to be formed into shapes corresponding to the side surfaces S1 and S3 of the main pole 15, respectively. The shapes of the side surfaces S2, S4, S5 and S6 of the main pole 15 are defined by the mold 85. The shape of the mold 85 is easily definable by photolithography. Thus, the shapes of the side surfaces S2, S4, S5 and S6 of the main pole 15 are easily definable by photolithography. Consequently, the method of manufacturing the magnetic head according to the present embodiment is able to provide a magnetic head that achieves prevention of unwanted erasure and improved write characteristics at the same time and allows for easy determination of the shapes of the main pole 15 and the two side shields 16A and 16B.

Second Embodiment

Figure 27:
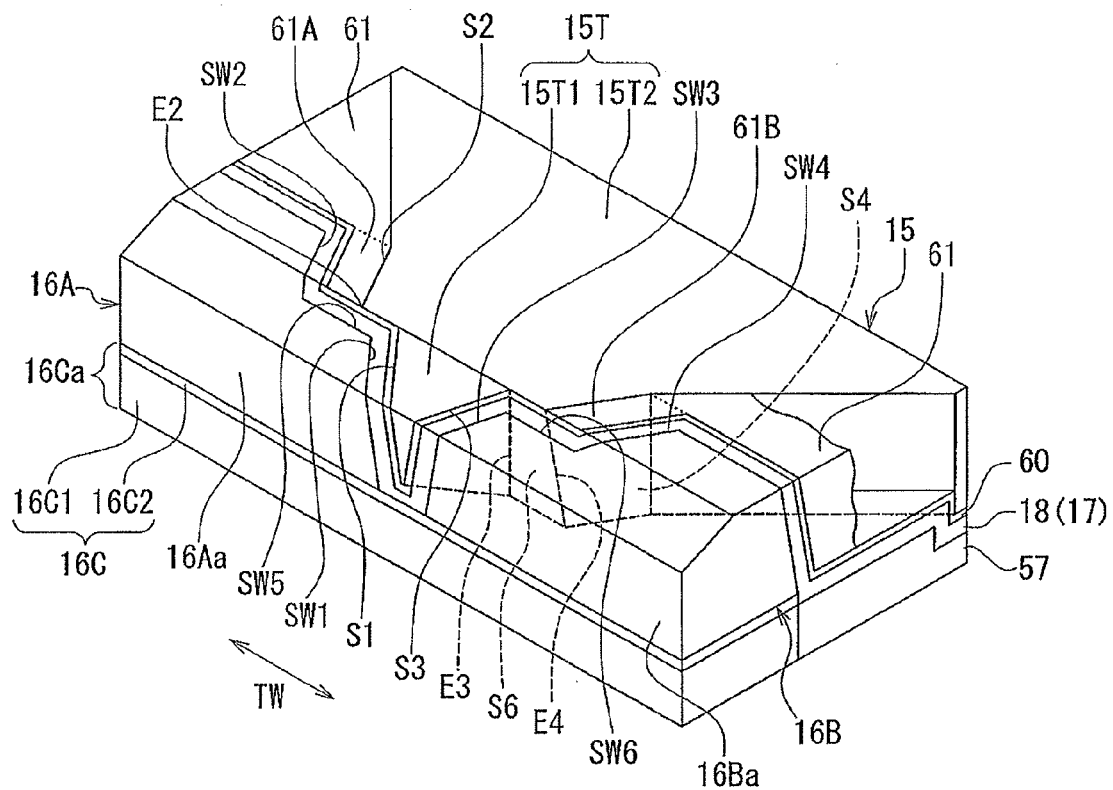
FIG. 27 is a perspective view of a main pole and two side shields of a magnetic head according to a second embodiment of the invention in an area near the medium facing surface.
Figure 28:
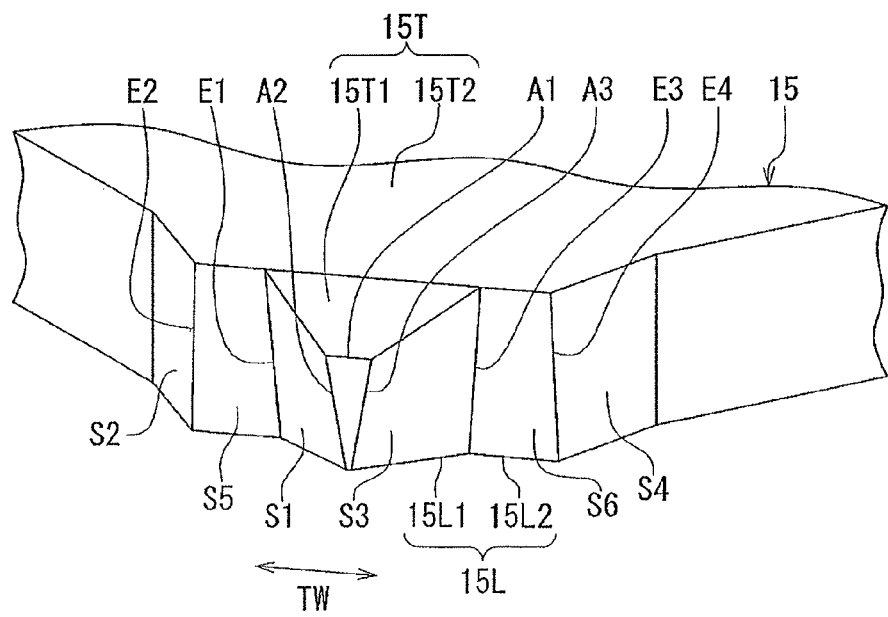
FIG. 28 is a perspective view of the main pole of the second embodiment of the invention in the area near the medium facing surface.
Figure 29:
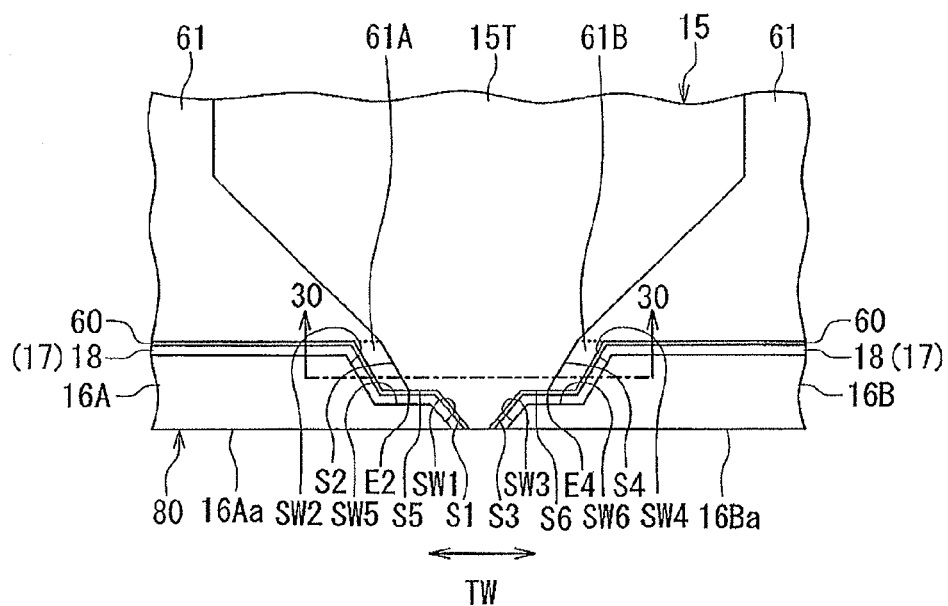
FIG. 29 is a plan view of the main pole and the two side shields of the second embodiment of the invention in the area near the medium facing surface.
Figure 30:
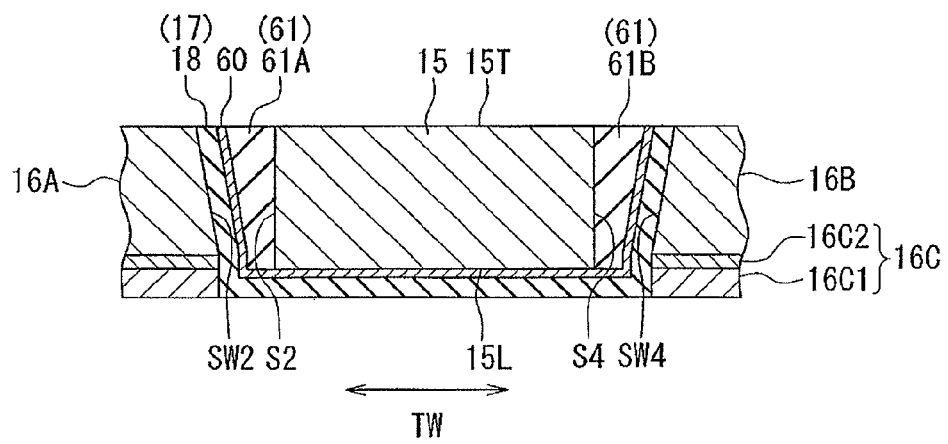
FIG. 30 is a cross-sectional view showing cross sections of the main pole and the two side shields taken along line 30-30 of FIG. 29.

A magnetic head according to a second embodiment of the invention will now be described. First, with reference to FIG. 27 to FIG. 30, a description will be given of the differences of the magnetic head according to the present embodiment from the magnetic head according to the first embodiment. FIG. 27 is a perspective view of the main pole and the two side shields of the present embodiment in the area near the medium facing surface. FIG. 28 is a perspective view of the main pole of the present embodiment in the area near the medium facing surface. FIG. 29 is a plan view of the main pole and the two side shields of the present embodiment in the area near the medium facing surface. FIG. 30 is a cross-sectional view showing cross sections of the main pole and the two side shields taken along line 30-30 of FIG. 29.

In the present embodiment, the main pole 15 differs in shape when compared with the first embodiment. As shown in FIG. 27 to FIG. 29, the second and fourth side surfaces S2 and S4 of the main pole 15 are located more outwardly in the present embodiment than in the example shown in FIG. 1 to FIG. 3 of the first embodiment. Further, the fifth and sixth side surfaces S5 and S6 of the main pole 15 are greater in width in the track width direction TW in the present embodiment than in the example shown in FIG. 1 to FIG. 3 of the first embodiment. The fifth sidewall SW5 of the first side shield 16A is opposed to the fifth side surface S5 of the main pole 15. The sixth sidewall SW6 of the second side shield 16B is opposed to the sixth side surface S6 of the main pole 15. The seed layer 60 is present between the first gap layer 18 and the fifth side surface S5 of the main pole 15 and between the first gap layer 18 and the sixth side surface S6 of the main pole 15, whereas no part of the nonmagnetic layer 61 is present therebetween.

The present embodiment allows the main pole 15 to have a large cross-sectional area perpendicular to the direction of flow of magnetic flux in the vicinities of the fifth side surface S5 and the sixth side surfaces S6, thereby allowing much magnetic flux to pass therethrough. Consequently, the present embodiment allows for improving write characteristics such as overwrite property.

Figure 31A:
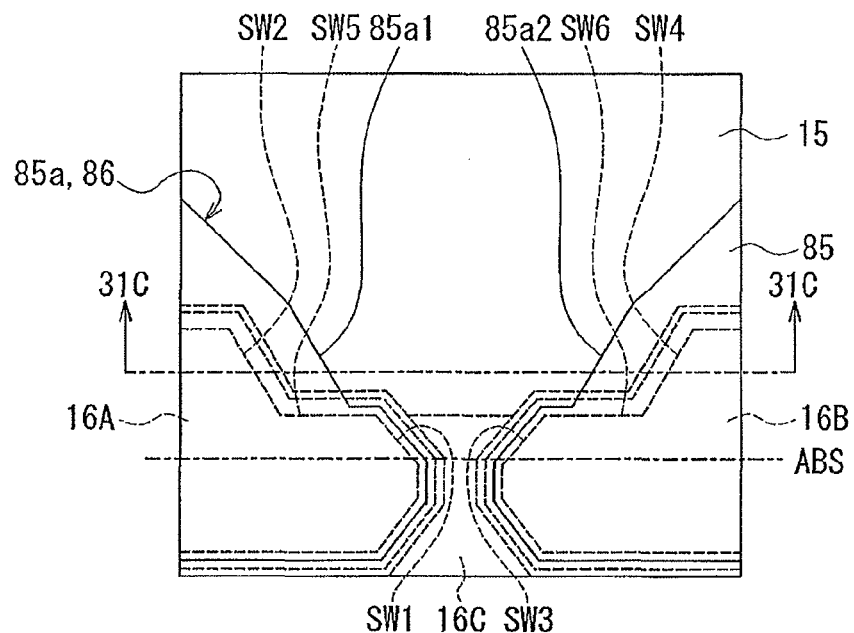
FIG. 31A to FIG. 31C are explanatory diagrams showing a step of a method of manufacturing the magnetic head according to the second embodiment of the invention.
Figure 31B:
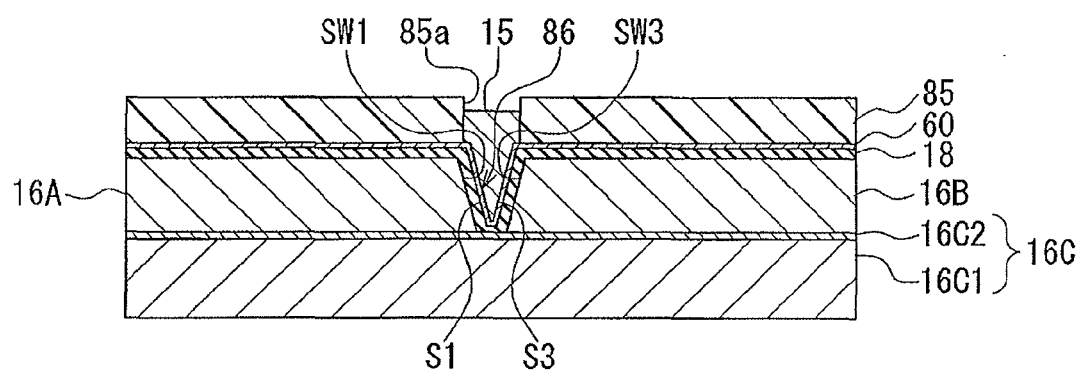
Figure 31C:
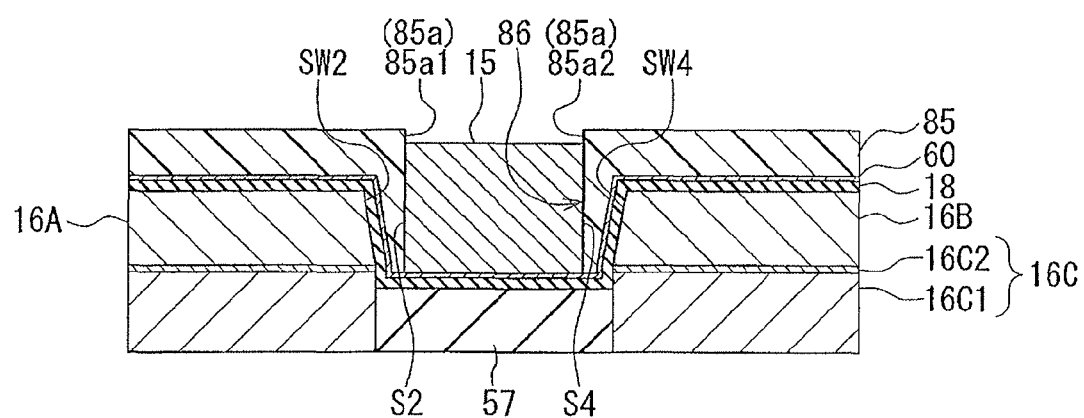

Reference is now made to FIG. 31A to FIG. 31C to describe the differences of the method of manufacturing the magnetic head according to the present embodiment from the method according to the first embodiment. FIG. 31A to FIG. 31C show a stack of layers formed in the process of manufacturing the magnetic head. FIG. 31A shows the top surface of part of the stack. FIG. 31B shows a cross section of the stack taken at the position at which the medium facing surface 80 is to be formed. FIG. 31C shows a cross section parallel to the position at which the medium facing surface 80 is to be formed. Line 31C-31C in FIG. 31A indicates the position of the cross section shown in FIG. 31C. In FIG. 31A, the symbol "ABS" indicates the position at which the medium facing surface 80 is to be formed. Note that portions that are closer to the substrate 1 relative to the bottom shield 16C and the nonmagnetic layer 57 are omitted from FIG. 31B and FIG. 31C.

In the present embodiment, the mold 85 differs in shape when compared with the first embodiment. As shown in FIG. 31A and FIG. 31C, the opening 85a of the mold 85 has a first inner wall 85a1 defining the shape of the second side surface S2 of the main pole 15 and a second inner wall 85a2 defining the shape of the fourth side surface S4 of the main pole 15. As shown in FIG. 31A and FIG. 31C, the first and second inner walls 85a1 and 85a2 are located more outwardly in the present embodiment than in the example shown in FIG. 22A and FIG. 22C of the first embodiment. When viewed from above, the first inner wall 85a1 intersects the portion of the seed layer 60 extending along the fifth sidewall SW5 of the first side shield 16A. When viewed from above, the second inner wall 85a2 intersects the portion of the seed layer 60 extending along the sixth sidewall SW6 of the second side shield 16B.

The remainder of configuration, function and effects of the present embodiment are similar to those of the first embodiment.

The present invention is not limited to the foregoing embodiments, and various modifications may be made thereto. For example, as far as the requirements of the appended claims are met, the shapes of the main pole 15, the first side shield 16A and the second side shield 16B are not limited to the examples illustrated in the foregoing embodiments, and can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording, comprising:

a medium facing surface facing a recording medium;

a coil producing a magnetic field that corresponds to data to be written on a recording medium;

a main pole allowing a magnetic flux that corresponds to the magnetic field produced by the coil to pass, and producing a write magnetic field for writing the data on a recording medium;

a write shield formed of a magnetic material;

a gap part formed of a nonmagnetic material and provided between the main pole and the write shield;

a nonmagnetic layer formed of a nonmagnetic material; and a substrate having a top surface, wherein:

the coil, the main pole, the write shield, the gap part, and the nonmagnetic layer are disposed above the top surface of the substrate, the main pole has an end face located in the medium facing surface, a top surface farthest from the top surface of the substrate, a bottom end opposite to the top surface, and first through sixth side surfaces, the end face of the main pole has a first side located at an end of the top surface of the main pole, and has a second side and a third side opposite to each other in a track width direction, a distance between the second side and the third side in the track width direction decreases with increasing proximity to the top surface of the substrate, the first side surface is connected to the second side, the second side surface is located farther from the medium facing surface than is the first side surface, the fifth side surface connects the first side surface to the second side surface, the third side surface is connected to the third side, the fourth side surface is located farther from the medium facing surface than is the third side surface, the sixth side surface connects the third side surface to the fourth side surface, each of the fifth and sixth side surfaces is located at a distance of 50 to 500 nm from the medium facing surface, a distance between the first side surface and the third side surface in the track width direction decreases with increasing proximity to the top surface of the substrate, the fifth side surface has a first edge located at a boundary between the first side surface and the fifth side surface, and a second edge located at a boundary between the second side surface and the fifth side surface, the sixth side surface has a third edge located at a boundary between the third side surface and the sixth side surface, and a fourth edge located at a boundary between the fourth side surface and the sixth side surface, a distance between the second edge and the fourth edge at a position closest to the top surface of the substrate is greater than a distance between the first edge and the third edge at the position closest to the top surface of the substrate, each of the fifth and sixth side surfaces has a width that increases with increasing proximity to the top surface of the substrate, the write shield includes a first side shield and a second side shield located on opposite sides of the main pole in the track width direction, the first side shield has an end face located in the medium facing surface, and has a first sidewall and a second sidewall, the second side shield has an end face located in the medium facing surface, and has a third sidewall and a fourth sidewall, the first sidewall is opposed to the first side surface of the main pole, the second sidewall is located farther from the medium facing surface than is the first sidewall, the third sidewall is opposed to the third side surface of the main pole, the fourth sidewall is located farther from the medium facing surface than is the third sidewall, a distance between the first sidewall and the third sidewall in the track width direction decreases with increasing proximity to the top surface of the substrate, a distance between the second sidewall and the fourth sidewall in the track width direction decreases with increasing proximity to the top surface of the substrate, the nonmagnetic layer includes a first portion located between the second side surface of the main pole and the second sidewall, and a second portion located between the fourth side surface of the main pole and the fourth sidewall, the gap part includes a first gap layer provided along the first sidewall and the third sidewall, no part of the nonmagnetic layer is present between the first gap layer and the first side surface of the main pole and between the first gap layer and the third side surface of the main pole, the first portion is in contact with the second edge of the fifth side surface, the second portion is in contact with the fourth edge of the sixth side surface, a distance between the second side surface of the main pole and the second sidewall is greater than a distance between the first side surface of the main pole and the first sidewall, and a distance between the fourth side surface of the main pole and the fourth sidewall is greater than a distance between the third side surface of the main pole and the third sidewall.

2. The magnetic head for perpendicular magnetic recording according to claim 1, wherein the write shield further includes a bottom shield and a top shield, the bottom shield has a top surface, and an end face that is located in the medium facing surface at a position on a rear side in a direction of travel of a recording medium relative to the end face of the main pole, the top shield has an end face that is located in the medium facing surface at a position on a front side in the direction of travel of a recording medium relative to the end face of the main pole, and the gap part further includes a second gap layer located between the main pole and the top shield.

3. The magnetic head for perpendicular magnetic recording according to claim 1, wherein the first side shield further has a fifth sidewall connecting the first sidewall to the second sidewall, and the second side shield further has a sixth sidewall connecting the third sidewall to the fourth sidewall.

4. A method of manufacturing a magnetic head for perpendicular magnetic recording, the magnetic head for perpendicular magnetic recording comprising:

a medium facing surface facing a recording medium;

a coil producing a magnetic field that corresponds to data to be written on a recording medium;

a main pole allowing a magnetic flux that corresponds to the magnetic field produced by the coil to pass, and producing a write magnetic field for writing the data on a recording medium;

a write shield formed of a magnetic material;

a gap part formed of a nonmagnetic material and provided between the main pole and the write shield;

a nonmagnetic layer formed of a nonmagnetic material; and a substrate having a top surface, wherein the coil, the main pole, the write shield, the gap part, and the nonmagnetic layer are disposed above the top surface of the substrate, the main pole has an end face located in the medium facing surface, a top surface farthest from the top surface of the substrate, a bottom end opposite to the top surface, and first through sixth side surfaces, the end face of the main pole has a first side located at an end of the top surface of the main pole, and has a second side and a third side opposite to each other in a track width direction, a distance between the second side and the third side in the track width direction decreases with increasing proximity to the top surface of the substrate, the first side surface is connected to the second side, the second side surface is located farther from the medium facing surface than is the first side surface, the fifth side surface connects the first side surface to the second side surface, the third side surface is connected to the third side, the fourth side surface is located farther from the medium facing surface than is the third side surface, the sixth side surface connects the third side surface to the fourth side surface, each of the fifth and sixth side surfaces is located at a distance of 50 to 500 nm from the medium facing surface, a distance between the first side surface and the third side surface in the track width direction decreases with increasing proximity to the top surface of the substrate, the fifth side surface has a first edge located at a boundary between the first side surface and the fifth side surface, and a second edge located at a boundary between the second side surface and the fifth side surface, the sixth side surface has a third edge located at a boundary between the third side surface and the sixth side surface, and a fourth edge located at a boundary between the fourth side surface and the sixth side surface, a distance between the second edge and the fourth edge at a position closest to the top surface of the substrate is greater than a distance between the first edge and the third edge at the position closest to the top surface of the substrate, each of the fifth and sixth side surfaces has a width that increases with increasing proximity to the top surface of the substrate, the write shield includes a first side shield and a second side shield located on opposite sides of the main pole in the track width direction, the first side shield has an end face located in the medium facing surface, and has a first sidewall and a second sidewall, the second side shield has an end face located in the medium facing surface and has a third sidewall and a fourth sidewall, the first sidewall is opposed to the first side surface of the main pole, the second sidewall is located farther from the medium facing surface than is the first sidewall, the third sidewall is opposed to the third side surface of the main pole, the fourth sidewall is located farther from the medium facing surface than is the third sidewall, a distance between the first sidewall and the third sidewall in the track width direction decreases with increasing proximity to the top surface of the substrate, a distance between the second sidewall and the fourth sidewall in the track width direction decreases with increasing proximity to the top surface of the substrate, the nonmagnetic layer includes a first portion located between the second side surface of the main pole and the second sidewall, and a second portion located between the fourth side surface of the main pole and the fourth sidewall, the gap part includes a first gap layer provided along the first sidewall and the third sidewall, no part of the nonmagnetic layer is present between the first gap layer and the first side surface of the main pole and between the first gap layer and the third side surface of the main pole, the first portion is in contact with the second edge of the fifth side surface, the second portion is in contact with the fourth edge of the sixth side surface, a distance between the second side surface of the main pole and the second sidewall is greater than a distance between the first side surface of the main pole and the first sidewall, and a distance between the fourth side surface of the main pole and the fourth sidewall is greater than a distance between the third side surface of the main pole and the third sidewall, the method comprising the steps of:

forming the first and second side shields;

forming the first gap layer after the first and second side shields are formed;

forming a mold by photolithography after the first gap layer is formed, the mold having a first inner wall defining a shape of the second side surface of the main pole and a second inner wall defining a shape of the fourth side surface of the main pole;

forming the main pole after the mold is formed;

removing the mold after the main pole is formed;

forming the nonmagnetic layer after the mold is removed; and forming the coil, wherein in the step of forming the mold, a receiving portion for receiving the main pole is formed by the first side shield, the second side shield, the first gap layer and the mold, and in the step of forming the main pole, the main pole is formed in the receiving portion, and shapes of the first and third side surfaces of the main pole are defined by the first sidewall of the first side shield, the third sidewall of the second side shield and the first gap layer, while the shape of the second side surface of the main pole and the shape of the fourth side surface of the main pole are defined by the first inner wall of the mold and the second inner wall of the mold, respectively.

5. The method according to claim 4, wherein the write shield further includes a bottom shield and a top shield, the bottom shield has a top surface, and an end face that is located in the medium facing surface at a position on a rear side in a direction of travel of a recording medium relative to the end face of the main pole, the top shield has an end face that is located in the medium facing surface at a position on a front side in the direction of travel of a recording medium relative to the end face of the main pole, and the gap part further includes a second gap layer located between the main pole and the top shield, the method further comprising the steps of:

forming the bottom shield before the first and second side shields are formed;

forming the second gap layer after the main pole is formed; and forming the top shield after the second gap layer is formed.

6. The method according to claim 4, wherein the first side shield further has a fifth sidewall connecting the first sidewall to the second sidewall, and the second side shield further has a sixth sidewall connecting the third sidewall to the fourth sidewall.

* * * * *